United States Patent
Komiyama

(10) Patent No.: US 10,634,885 B2
(45) Date of Patent: Apr. 28, 2020

(54) WIDE-ANGLE LENS

(71) Applicant: NIDEC SANKYO CORPORATION, Nagano (JP)

(72) Inventor: Tadashi Komiyama, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 144 days.

(21) Appl. No.: 15/764,881

(22) PCT Filed: Jul. 24, 2017

(86) PCT No.: PCT/JP2017/026594
§ 371 (c)(1),
(2) Date: Mar. 30, 2018

(87) PCT Pub. No.: WO2018/021205
PCT Pub. Date: Feb. 1, 2018

(65) Prior Publication Data
US 2018/0284397 A1 Oct. 4, 2018

(30) Foreign Application Priority Data

Jul. 25, 2016 (JP) ................. 2016-145157

(51) Int. Cl.
*G02B 13/06* (2006.01)
*G02B 9/64* (2006.01)
*G02B 13/18* (2006.01)

(52) U.S. Cl.
CPC ............... *G02B 13/06* (2013.01); *G02B 9/64* (2013.01); *G02B 13/18* (2013.01)

(58) Field of Classification Search
CPC .. G02B 13/0045; G02B 13/008; G02B 13/06; G02B 13/14; G02B 5/20; G02B 9/64; H04N 5/2253
See application file for complete search history.

(56) References Cited

U.S. PATENT DOCUMENTS

| 5,448,408 A * | 9/1995 | Togino ..................... G02B 9/64 359/650 |
| 2003/0086184 A1* | 5/2003 | Abe ......................... G02B 3/00 359/796 |
| 2015/0205070 A1* | 7/2015 | Lee ..................... G02B 13/0045 359/713 |

FOREIGN PATENT DOCUMENTS

| CN | 101556370 | 10/2009 |
| CN | 105527713 | 4/2016 |

(Continued)

OTHER PUBLICATIONS

"International Search Report (Form PCT/ISA/210) of PCT/JP2017/026594", dated Oct. 17, 2017, with English translation thereof, pp. 1-4.

(Continued)

*Primary Examiner* — Joseph P Martinez
*Assistant Examiner* — Vipin Patel
(74) *Attorney, Agent, or Firm* — JCIPRNET

(57) ABSTRACT

The wide-angle lens includes seven lenses and is provided with a diaphragm between the fourth lens and the fifth lens. The first lens is a negative meniscus lens whose convex surface faces the object side. The second lens is a negative meniscus lens whose at least one surface is an aspherical surface and whose concave surface faces an image side. The third lens is a negative meniscus lens whose at least one surface is an aspherical surface and whose concave surface faces the object side. The fourth lens and the fifth lens are positive lenses. The sixth lens is a negative lens whose concave surface faces the image side. The seventh lens is a double convex lens whose convex surfaces face both of the object side and the image side, and configures a joined lens with the sixth lens.

16 Claims, 12 Drawing Sheets

(56) References Cited

FOREIGN PATENT DOCUMENTS

| | | |
|---|---|---|
| JP | H04246606 | 9/1992 |
| JP | H04267212 | 9/1992 |
| JP | 2007164079 | 6/2007 |
| JP | 2009063877 | 3/2009 |
| JP | 2011107425 | 6/2011 |
| JP | 2014085559 | 5/2014 |
| JP | 2014089349 | 5/2014 |
| JP | 2015034922 | 2/2015 |

OTHER PUBLICATIONS

"Office Action of China Counterpart Application" with English translation, dated Nov. 7, 2019, p. 1-p. 12.

\* cited by examiner

Spherical aberration

Chromatic aberration of magnification

Astigmatism / Distortion

Transverse aberration

Spherical aberration

Chromatic aberration of magnification

Astigmatism / Distortion

Transverse aberration

Spherical aberration

Chromatic aberration of magnification

Astigmatism / Distortion

Transverse aberration

Spherical aberration

Chromatic aberration of magnification

Astigmatism / Distortion

Transverse aberration

WIDE-ANGLE LENS

CROSS-REFERENCE TO RELATED APPLICATION

This application is a 371 application of the International PCT application serial no. PCT/JP2017/026594, filed on Jul. 24, 2017, which claims the priority benefits of Japan application no. JP 2016-145157, filed on Jul. 25, 2016. The entirety of each of the abovementioned patent applications is hereby incorporated by reference herein and made a part of this specification.

TECHNICAL FIELD

The present invention relates to wide-angle lenses employed for an around view monitor of a vehicle, etc.

BACKGROUND ART

It is required for lenses of recent date utilized for a monitoring purpose or for a vehicle-installation purpose to have a wide angle and a high resolution. Regarding such wide-angle lenses, in order to achieve a high resolution, a configuration has been proposed, which is provided with a joined lens on the image side relative to a diaphragm so as to reduce spherical aberration (see Patent Literatures 1, 2, 3, and 4). Furthermore, in Patent Literatures 3 and 4, a configuration which is further provided with a joined lens on the object side relative to the diaphragm is proposed.

CITATION LIST

Patent Literature

Patent Literature 1: Japanese Unexamined Patent Application Publication No. 2015-34922
Patent Literature 2: Japanese Unexamined Patent Application Publication No. 2009-63877
Patent Literature 3: Japanese Unexamined Patent Application Publication No. 2014-85559
Patent Literature 4: Japanese Unexamined Patent Application Publication No. 2014-89349

SUMMARY OF INVENTION

Technical Problems

However, in a case of providing with a joined lens only on the image side relative to a diaphragm as described in configurations of Patent Literatures 1 and 2, astigmatism and chromatic aberration of magnification at a peripheral section cannot be reduced, which rises a problem, regarding an around view monitor of a vehicle, etc, that such requirements as increasing the number of pixels and further improving a high resolution cannot be satisfied. Furthermore, even in a case of providing with joined lenses on both sides with respect to a diaphragm as described in configurations of Patent literatures 3 and 4, as there is only one joined lens on the image side relative to the diaphragm, an angle of incidence to the imaging surface is large, which rises a problem that aberration is likely to occur.

In view of the above problems, the object of the present invention is to provide a wide-angle lens with which an angle of incidence to an imaging surface as well as astigmatism and chromatic aberration of magnification at a peripheral section are reduced.

Solutions to Problems

To solve the above problems, a wide-angle lens according to the present invention includes a first lens, a second lens, a third lens, a fourth lens, a diaphragm, a fifth lens, a sixth lens, and a seventh lens, which are arranged in this order from an object side. Further, the first lens is a negative meniscus lens whose convex surface faces the object side. The second lens is a negative meniscus lens whose at least one surface is an aspherical surface and whose concave surface faces an image side. The third lens is a negative meniscus lens whose at least one surface is an aspherical surface and whose concave surface faces the object side. The fourth lens is a positive lens. The fifth lens is a positive lens. The sixth lens is a negative lens whose concave surface faces the image side. The seventh lens is a double convex lens whose convex surfaces face both of the object side and the image side. The sixth lens and the seventh lens configure a joined lens, of which the surface of the sixth lens on the image side and the surface of the seventh lens on the object side are joined by use of a resin material.

In the present invention, spherical aberration can be reduced because a joined lens of the sixth lens and the seventh lens is provided on the image side relative to the diaphragm. Furthermore, in accordance with arrangement of the third lens, which is a negative lens, it is possible to achieve a lens configuration with arrangement of the fourth lens and the fifth lens, which are positive lenses, on both sides (i.e., the object side and the image side) of the diaphragm. In the lens configuration, both sides of the diaphragm are nearly symmetric. Accordingly, it is possible to reduce astigmatism and chromatic aberration of magnification at a peripheral section. Thus, even in a case of employing an imaging element with a small pixel size, it is possible to reduce decrease in a light amount, change in a color balance, etc. Furthermore, in accordance with arrangement of the third lens, which is a negative lens, it is possible to divide negative power in front of the fourth lens with the first lens, the second lens, and the third lens. Therefore, regarding the first lens, depth of the concave surface on the image side can be shallow. Accordingly, the first lens is easily manufactured. Furthermore, in accordance with arrangement of the fifth lens, which is a positive lens, between the diaphragm and the joined lens of the sixth lens and the seventh lens, it is possible that an angle of incidence to the imaging surface can be relatively small.

In the present invention, it is possible to adopt a form in which the fifth lens is a double convex lens whose convex surfaces face both of the object side and the image side.

In the present invention, it is possible to adopt a form in which the fourth lens is a double convex lens whose convex surfaces face both of the object side and the image side. In the above form, the fourth lens, which is arranged on the object side relative to the diaphragm, and the fifth lens, which is arranged on the image side relative to the diaphragm, are both double convex lenses. Therefore, a configuration in which both sides of the diaphragm are nearly symmetric. Accordingly, it is possible to reduce astigmatism and chromatic aberration of magnification at a peripheral section.

In the present invention, it is possible to adopt a form in which at least one of the fourth lens and the fifth lens is a glass lens. In the above form, thermal properties of the wide-angle lens can be improved, compared with a case where the fourth lens and the fifth lens are plastic lenses.

In the present invention, it is possible to adopt a form in which the first lens is a glass lens. In the present invention, it is possible to divide negative power in front of the third lens with the first lens, the second lens, and the third lens. Therefore, regarding the first lens, depth of the concave surface on the image side can be shallow. Accordingly, even in a case of employing a glass lens for the first lens, the first lens is easily manufactured.

In the present invention, it is possible to adopt a form in which, in a case where a combined focal length of the fifth lens, the sixth lens, and the seventh lens is f567 (mm) and a focal length of an entire lens system is f0 (mm), the combined focal length f567 of the fifth lens, the sixth lens, and the seventh lens and the focal length f0 of the entire lens system meet a condition below:

$$2 < f567/f0 < 4.$$

In the present invention, it is possible to adopt a form in which, in a case where a combined focal length of the fourth lens and the fifth lens is f45 (mm) and a focal length of an entire lens system is f0 (mm), the combined focal length f45 of the fourth lens and the fifth lens and the focal length f0 of the entire lens system meet a condition below:

$$1 < f45/f0 < 3.$$

In the present invention, it is possible to adopt a form in which, in a case where: the first lens, the second lens, and the third lens form a negative lens group; the fourth lens, the fifth lens, the sixth lens, and the seventh lens form a positive lens group; and a combined focal length of the negative lens group is fN (mm) and a combined focal length of the positive lens group is fP (mm), then the combined focal length fN of the negative lens group and the combined focal length fP of the positive lens group meet a condition below:

$$0.1 < |fN/fP| < 0.5.$$

In the present invention, it is possible to adopt a form in which, in a case where an object-to-image distance is d0 and a focal length of an entire lens system is f0 (mm), the object-to-image distance d0 and the focal length f0 of the entire lens system meet a condition below:

$$8 < d0/f0 < 15.$$

In the present invention, it is possible to adopt a form in which, in a case where an abbe number of the sixth lens is ν6 and an abbe number of the seventh lens is ν7, the abbe number ν6 and the abbe number ν7 respectively meet conditions below:

$$\nu 6 \leq 30; \text{ and}$$

$$50 \leq \nu 7.$$

Effect of the Invention

In the present invention, spherical aberration can be reduced because a joined lens of the sixth lens and the seventh lens is provided on the image side relative to the diaphragm. Furthermore, in accordance with arrangement of the third lens, which is a negative lens, it is possible to achieve a lens configuration with arrangement of the fourth lens and the fifth lens, which are positive lenses, on both sides (i.e., the object side and the image side) of the diaphragm. In the lens configuration, both sides of the diaphragm are nearly symmetric. Accordingly, it is possible to reduce astigmatism and chromatic aberration of magnification at a peripheral section. Thus, even in a case of employing an imaging element with a small pixel size, it is possible to reduce decrease in a light amount, change in a color balance, etc. Furthermore, in accordance with arrangement of the third lens, which is a negative lens, it is possible to divide negative power in front of the fourth lens with the first lens, the second lens, and the third lens. Therefore, regarding the first lens, depth of the concave surface on the image side can be shallow. Accordingly, the first lens is easily manufactured. Furthermore, in accordance with arrangement of the fifth lens, which is a positive lens, between the diaphragm and the joined lens of the sixth lens and the seventh lens, it is possible that an angle of incidence to the imaging surface can be relatively small.

MODE FOR CARRYING OUT THE INVENTION

The following description explains embodiments of a wide-angle lens to which the present invention is applied, with reference to drawings.

Embodiment 1

Figure 1:
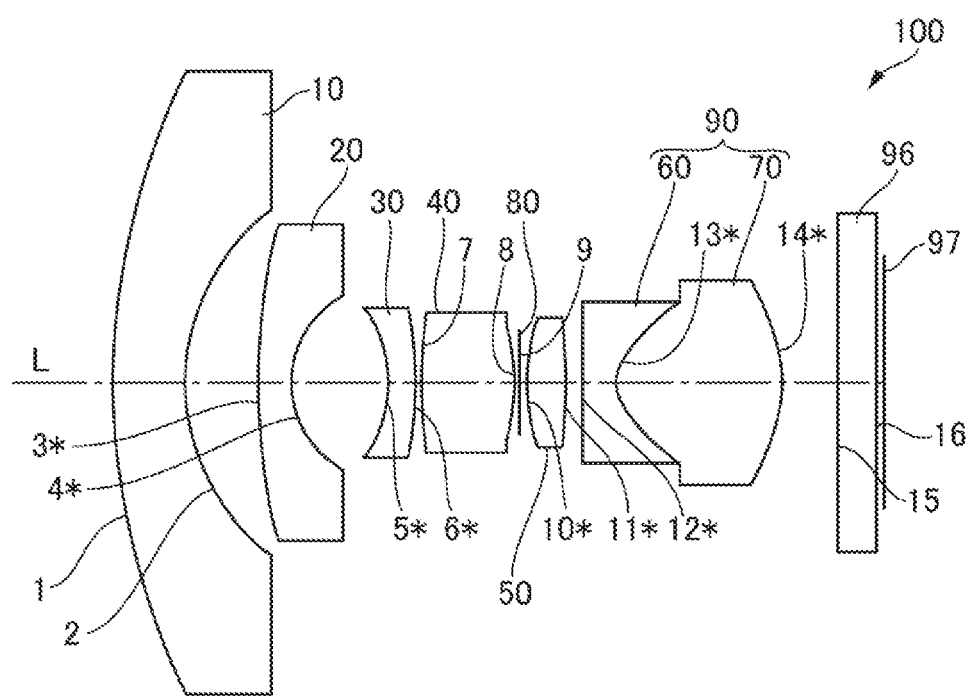
FIG. 1 is an explanatory diagram illustrating a configuration of a wide-angle lens according to Embodiment 1 of the present invention.
Figure 2A:
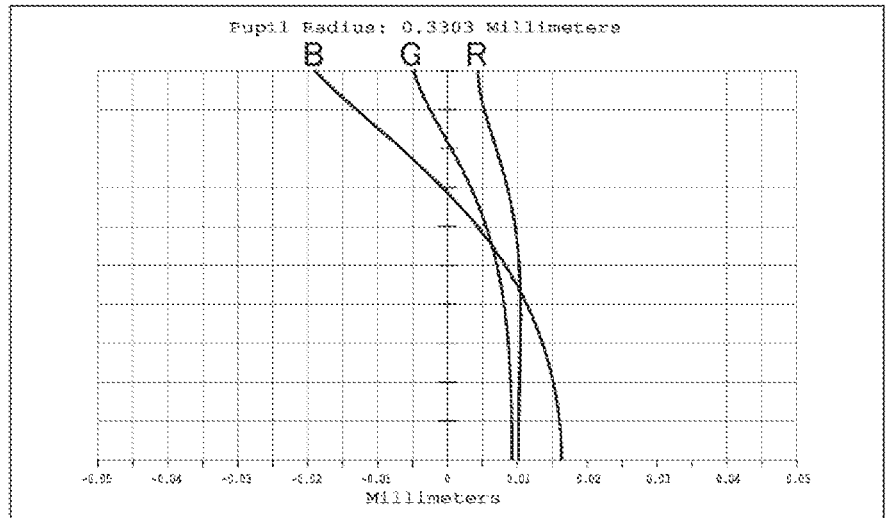
FIGS. 2(a) and 2(b) are explanatory diagrams illustrating spherical aberration and chromatic aberration of magnification of the wide-angle lens illustrated in FIG. 1.
Figure 2B:
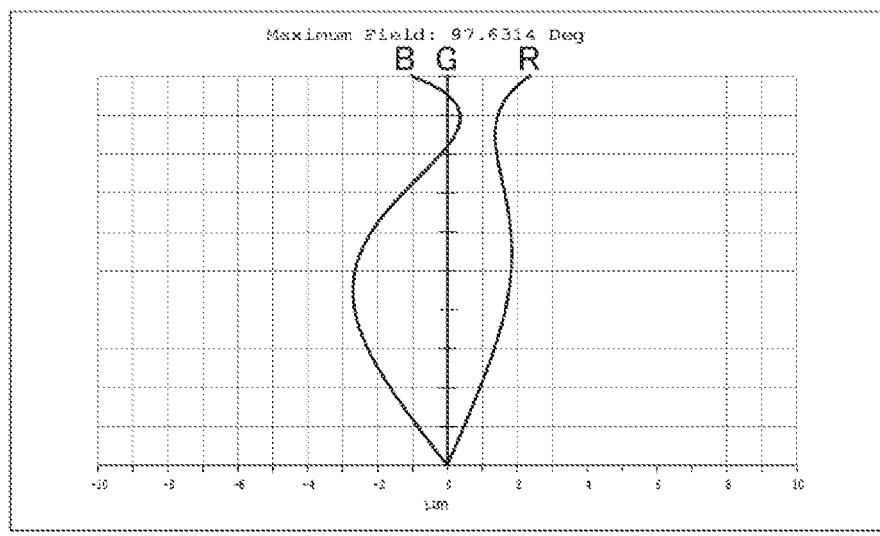
Figure 3A:
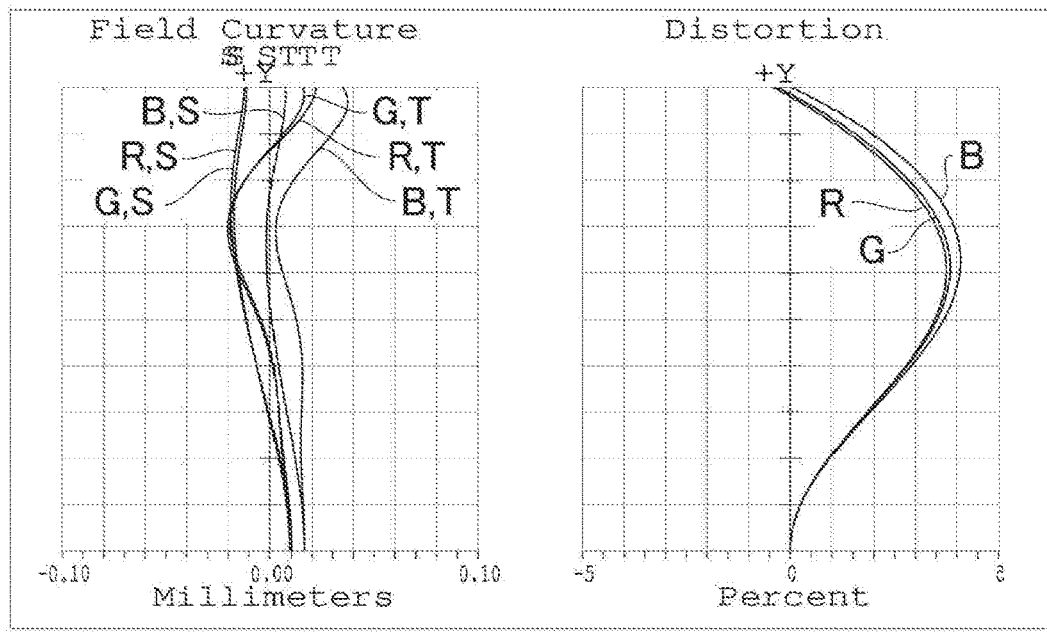
FIGS. 3(a) and 3(b) are explanatory diagrams illustrating astigmatism and transverse aberration of the wide-angle lens illustrated in FIG. 1.
Figure 3B:
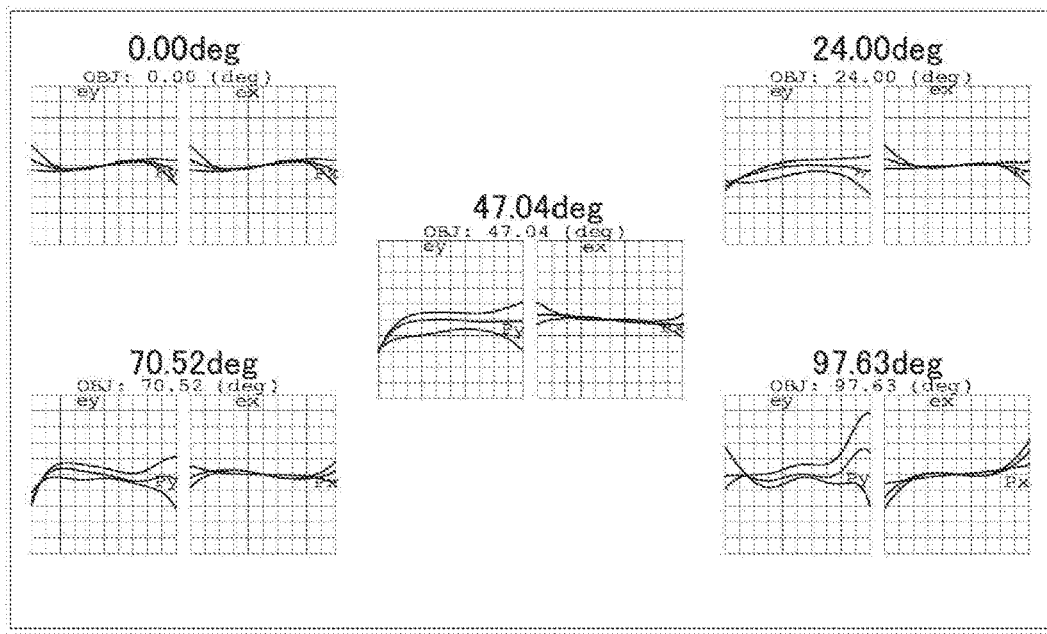

FIG. 1 is an explanatory diagram illustrating a configuration of a wide-angle lens 100 according to Embodiment 1 of the present invention. FIGS. 2(a) and 2(b) are explanatory diagrams illustrating spherical aberration and chromatic aberration of magnification of the wide-angle lens 100 illustrated in FIG. 1. Further, in FIGS. 2 (*a*) and 2(*b*), an aberration diagram of spherical aberration and an aberration diagram of chromatic aberration of magnification are illustrated, respectively. FIGS. 3(*a*) and 3(*b*) are explanatory diagrams illustrating astigmatism and transverse aberration of the wide-angle lens 100 illustrated in FIG. 1. Further, in FIGS. 3 (*a*) and 3(*b*), an aberration diagram of astigmatism and an aberration diagram of transverse aberration are illustrated. Note that, regarding each surface 1 through 16 illustrated in FIG. 1, "*" is assigned in case of an aspherical surface. In FIGS. 2 (*a*) and 2(*b*) and FIGS. 3 (*a*) and 3 (*b*), aberration with respect to a red light R (i.e., wavelength: 486 mu), a green light G (i.e., wavelength: 588 nm), and a blue light B (i.e., wavelength: 656 nm) are respectively illustrated. Further, in FIG. 2 (*a*), spherical aberration in a case where the pupil radius (i.e., Pupil Radius) is 0.3303 mm is illustrated, and, in FIG. 2 (*b*), chromatic aberration of magnification in a case where the maximum field (i.e., Max. Field) is 97.6314 deg is illustrated. In FIG. 3 (*a*), properties with respect to a sagittal direction are assigned with S, and properties with respect to a tangential direction are assigned with T. Furthermore, distortion illustrated in FIG. 3 (*a*) indicates percentage of change of an image with respect to a central section and a peripheral section of imaging. Further, it may be said that, the smaller an absolute value of a numerical value that is indicative of distortion is, the higher the precision of a lens is. In FIG. 3 (*b*), transverse aberration in respective cases of angles of 0.00 deg, 24.00 deg, 47.04 deg, 70.52 deg, and 97.63 deg with respect to two directions (i.e., a Y axis direction and an X axis direction), which are orthogonal to an optical axis, are illustrated. Note that the same is substantially true of FIGS. 4 through 12(*b*), which are described below.

As illustrated in FIG. 1, the wide-angle lens 100 of the present embodiment is configured with a first lens 10, a second lens 20, a third lens 30, a fourth lens 40, a diaphragm 80, a fifth lens 50, a sixth lens 60, and a seventh lens 70, which are arranged in this order from the object side. Further, a plate-shaped filter 96 and an imaging element 97 are arranged on the image side relative to the seventh lens 70.

The first lens 10 is a negative meniscus lens (i.e., a meniscus lens with negative power) whose convex surface faces the object side. The second lens 20 is a negative meniscus lens (i.e., a meniscus lens with negative power) whose at least one surface is an aspherical surface and whose concave surface faces the image side. The third lens 30 is a negative meniscus lens (i.e., a meniscus lens with negative power) whose at least one surface is an aspherical surface and whose concave surface faces the object side. The fourth lens 40 is a positive lens (i.e., a lens with positive power). The fifth lens 50 is a positive lens (i.e., a lens with positive power). The sixth lens 60 is a negative lens (i.e., a lens with negative power) whose concave surface faces the image side. The seventh lens 70 is a double convex lens with positive power whose convex surfaces face both of the object side and the image side.

The sixth lens 60 and the seventh lens 70 configure a joined lens 90, of which the surface of the sixth lens 60 on the image side and the surface of the seventh lens 70 on the object side are joined by use of a translucent resin material (unillustrated). Therefore, a thirteenth surface 13 of the wide-angle lens 100 is configured with a joint surface of the surface of the sixth lens 60 on the image side and the surface of the seventh lens 70 on the object side.

More specifically, with respect to the first lens 10, the surface (i.e., a first surface 1) on the object side is a spherical convex surface and the surface (i.e., a second surface 2) on the image side is a spherical concave surface. With respect to the second lens 20, the surface (i.e., a third surface 3) on the object side is an aspherical convex surface and the surface (i.e., a fourth surface 4) on the image side is an aspherical concave surface. With respect to the third lens 30, the surface (i.e., a fifth surface 5) on the object side is an aspherical concave surface and the surface (i.e., a sixth surface 6) on the image side is an aspherical convex surface. The fourth lens 40 is a double convex lens of which both of the surface (i.e., a seventh surface 7) on the object side and the surface (i.e., an eighth surface 8) on the image side are spherical convex surfaces. The fifth lens 50 is a double convex lens of which both of the surface (i.e., a tenth surface 10) on the object side and the surface (i.e., an eleventh surface 11) on the image side are aspherical convex surfaces. With respect to the sixth lens 60, the surface (i.e., a twelfth surface 12) on the object side is an aspherical convex surface and the surface (i.e., a thirteenth surface 13) on the image side is an aspherical concave surface. With respect to the seventh lens 70, the surface (i.e., the thirteenth surface 13) on the object side is an aspherical convex surface and the surface (i.e., a fourteenth surface 14) on the image side is an aspherical convex surface. The diaphragm 80 configures a ninth surface 9. Further, the surface of the filter 96 on the object side configures a fifteenth surface 15 and the surface of the filter 96 on the image side configures a sixteenth surface 16.

Here, each of the first lens 10, the fourth lens 40, and the fifth lens 50 is a glass lens or a plastic lens, and each of the second lens 20, the third lens 30, the sixth lens 60, and the seventh lens 70 is a plastic lens. Furthermore, at least one of the fourth lens 40 and the fifth lens 50 is a glass lens. In the present embodiment, one of the fourth lens 40 and the fifth lens 50 is a glass lens. More specifically, the fourth lens 40 is a glass lens, and the fifth lens 50 is a plastic lens formed of a type of acrylic resin, a type of polycarbonate, a type of polyolefin, etc. Furthermore, the first lens 10 is a glass lens, and each of the second lens 20, the third lens 30, the sixth lens 60, and the seventh lens 70 is a plastic lens formed of a type of acrylic resin, a type of polycarbonate, a type of polyolefin, etc.

The properties of the wide-angle lens 100 of the present embodiment are as indicated in Table 1, FIGS. 2(*a*) and 2(*b*), and FIGS. 3(*a*) and 3(*b*). Further, physical properties, aspheric coefficients, etc., of each surface are as indicated in Table 2. On Table 1, the following items are indicated.

Focal length f0 of the entire lens system (i.e., Effective Focal Length)
   Object-to-image distance (i.e., Total Track)
   F-value of the entire lens system (i.e., Image Space F/#)
   Maximum field angle (i.e., Max. Field Angle)
   Horizontal field angle (i.e., Horizontal Field Angle)
   In the first section of Table 2, the following items of each surface are indicated. Each unit of a curvature radius, a thickness, and a focal length is mm. Here, a curvature radius has a positive value in a case where a lens surface is a convex surface bulging towards the object side or a concave surface depressed towards the object side. Further, a curvature radius has a negative value in a case where a lens surface is a convex surface bulging towards the image side or a concave surface depressed towards the image side.
   Curvature radius (i.e., Radius)
   Thickness (i.e., Thickness)
   Refractive index Nd
   Abbe number vd
   Focal length f In the second and the third sections of Table 2, aspheric coefficients A4, A6, A8, and A10 in a case where shapes of aspheric surfaces out of all surfaces are expressed by the expression below (i.e., Formula 1) are indicated. In the expression below, a sag amount (i.e., an axis in the optical axis direction) is represented by z; height (i.e., height of a light beam) in a direction orthogonal to the optical axis is represented by r; a conic coefficient is represented by k; and an inverse number of a curvature radius is represented by c.

$$Z = \frac{cr^2}{1 + \sqrt{1 - (1+K)c^2r^2}} + \sum_{n=2}^{5} A_{2n}r^{2n} \qquad [\text{Formula 1}]$$

TABLE 1

| Effective Focal Length (f0) | 1.320 mm |
|---|---|
| Total Track | 13.950 mm |
| Image Space F/# | 2.0 |
| Max. Field of Angle | 195 deg |
| Horizontal Field of Angle | 195 deg |

As illustrated in Table 1, with respect to the wide-angle lens 100 of the present embodiment, the focal length f0 of the entire lens system is 1.320 mm; the object-to-image distance is 13.950 mm; the F-value of the entire lens system is 2.0; the maximum field angle is 195 deg; and the horizontal field angle is 195 deg.

As illustrated in Table 2, the abbe numbers vd of the second lens 20, the third lens 30, and the seventh lens 70 are all greater than 50. More specifically, the abbe numbers vd of the second lens 20, the third lens 30, and the seventh lens 70 are all 55.8, and the refractive indexes Nd of the second lens 20, the third lens 30, and the seventh lens 70 are all 1.531. The refractive index Nd of the sixth lens 60 is 1.635, and therefore the sixth lens 60 and the seventh lens 70 differ in refractive indexes Nd.

As described above, the wide-angle lens 100 of the present embodiment has a lens configuration with seven lenses in six groups, of which five lenses among the seven lenses are plastic. Accordingly, it is possible to reduce cost of the wide-angle lens 100 as well as reducing size and weight.

Furthermore, in the present embodiment, in accordance with arrangement of the third lens 30, which is a negative lens, it is possible to achieve a lens configuration with arrangement of the fourth lens 40 and the fifth lens 50, which are positive lenses, on both sides (i.e., the object side and the image side) of the diaphragm 80, respectively. Further, in the lens configuration, the sides of the diaphragm 80 are nearly symmetric. In addition, the fourth lens 40 and the fifth lens

TABLE 2

| Surf | Radius | Thickness | Nd | vd | f |
|---|---|---|---|---|---|
| 1 | 12.200 | 1.300 | 1.834 | 42.7 | −7.088 |
| 2 | 3.790 | 1.340 | | | |
| 3* | 13.100 | 0.600 | 1.531 | 55.8 | −3.823 |
| 4* | 1.730 | 1.740 | | | |
| 5* | −2.070 | 0.500 | 1.531 | 55.8 | −6.225 |
| 6* | −6.000 | 0.100 | | | |
| 7 | 8.000 | 1.670 | 1.806 | 40.7 | 3.799 |
| 8 | −4.500 | 0.100 | | | |
| 9(stop) | Infinity | 0.140 | | | |
| 10* | 3.317 | 0.710 | 1.584 | 30.2 | 4.100 |
| 11* | −7.91 | 0.300 | | | |
| 12* | 22.700 | 0.600 | 1.635 | 24.0 | −1.320 |
| 13* | 0.800 | 3.010 | 1.531 | 55.8 | 1.688 |
| 14* | −2.264 | 1.015 | | | |
| 15 | Infinity | 0.700 | 1.517 | 64.1 | |
| 16 | Infinity | 0.125 | | | |

Aspheric Coefficient

| Surf | c (1/Radius) | K | A4 | A6 | A8 |
|---|---|---|---|---|---|
| 3 | 7.63359E−02 | 0.00000E+00 | −1.90000E−03 | 3.75000E−04 | −3.25000E−06 |
| 4 | 5.78035E−01 | 1.00000E−01 | −1.50000E−02 | 1.87500E−04 | −1.23500E−03 |
| 5 | −4.83092E−01 | 0.00000E+00 | −8.00000E−03 | 1.00000E−02 | −1.41000E−03 |
| 6 | −1.66667E−01 | −1.50000E−01 | −7.70000E−03 | 9.06000E−03 | −1.29000E−03 |
| 10 | 3.01477E−01 | 0.00000E+00 | −5.02000E−03 | 4.29000E−03 | 0.00000E+00 |
| 11 | −1.26422E−01 | 0.00000E+00 | 1.30000E−02 | −2.96000E−03 | 1.40000E−03 |
| 12 | 4.40529E−02 | 0.00000E+00 | −1.10000E−02 | −4.61000E−03 | 5.21000E−04 |
| 13 | 1.25000E+00 | −1.00000E+00 | −4.00000E−02 | 3.26000E−03 | 1.09000E−03 |
| 14 | −4.41696E−01 | −2.10000E+01 | 9.39000E−03 | −1.47000E−03 | 4.92000E−05 |

| Surf | A10 |
|---|---|
| 3 | 0.00000E+00 |
| 4 | 0.00000E+00 |
| 5 | 0.00000E+00 |
| 6 | 0.00000E+00 |
| 10 | 0.00000E+00 |
| 11 | 0.00000E+00 |
| 12 | 3.79000E−05 |
| 13 | −6.90000E−05 |
| 14 | 2.55000E−05 |

50 are double convex lenses whose convex surfaces face both of the object side and the image side. Therefore, a configuration in which the sides, with reference to the diaphragm 80, are further symmetric. Accordingly, it is possible to reduce astigmatism and chromatic aberration of magnification at the peripheral section. Thus, even in a case of employing an imaging element 97 with a small pixel size, it is possible to reduce decrease in a light amount, change in a color balance, etc.

Furthermore, in accordance with arrangement of the third lens 30, which is a negative lens, it is possible to divide negative power in front of the fourth lens 40 with the first lens 10, the second lens 20, and the third lens 30. Thus, regarding the first lens 10, depth of the concave surface (i.e., the second surface 2) on the image side can be shallow, and therefore the first lens 10 is easily manufactured. Particularly, as described in the present embodiment, even in a case where the first lens 10 is a glass lens, the first lens 10 is easily manufactured because, regarding the first lens 10, depth of the concave surface (i.e., the second surface 2) on the image side can be shallow.

Furthermore, in accordance with arrangement of the fifth lens 50, which is a positive lens, an angle of incidence to the imaging surface can be relatively small.

Furthermore, the abbe numbers vd of the second lens 20, the third lens 30, and the seventh lens 70 are all greater than 50, and therefore chromatic dispersion is small. In addition, each of the first lens 10, the second lens 20, and the third lens 30 is a meniscus lens, with which axial chromatic aberration is offset by a surface on the object side and a surface on the image side. Accordingly, axial chromatic aberration of the wide-angle lens 100 is small.

Furthermore, at least one of the fourth lens 40 and the fifth lens 50 is a glass lens, and therefore thermal properties of the wide-angle lens 100 can be improved, compared with a case where both of the fourth lens 40 and the fifth lens 50 are plastic lenses.

Furthermore, both surfaces of the second lens 20, the third lens 30, the fifth lens 50, the sixth lens 60, and the seventh lens 70 are all aspherical surfaces, and therefore aberration such as spherical aberration can be reduced.

Furthermore, in a case where a combined focal length of the fifth lens 50, the sixth lens 60, and the seventh lens 70 is f567 (mm) and a focal length of the entire lens system is f0 (mm), the combined focal length f567 of the fifth lens 50, the sixth lens 60, and the seventh lens 70 and the focal length f0 of the entire lens system meet Condition (1) below.

$2 < f567/f0 < 4$ Condition (1):

More specifically, the combined focal length f567 of the fifth lens 50, the sixth lens 60, and the seventh lens 70 is 3.736 mm, and the focal length f0 of the entire lens system is 1.320 mm. Therefore, as f567/f0 is 2.830, the above Condition (1) is met.

As described above, in the present embodiment, f567/f0 is greater than 2. Therefore, the power provided by the fifth lens 50, the sixth lens 60, and the seventh lens 70 is prevented from becoming weak. Accordingly, correction of each type of aberration, especially chromatic aberration, can be favorably performed, and high optical performance can be achieved. Furthermore, as f567/f0 is lower than 4, the power provided by the fifth lens 50, the sixth lens 60, and the seventh lens 70 is prevented from becoming too strong. Accordingly, it is possible to avoid the total length of the entire lens system from becoming long.

Furthermore, it is further preferable that the combined focal length f567 of the fifth lens 50, the sixth lens 60, and the seventh lens 70 and the focal length f0 of the entire lens system meet Condition (1-2) below.

$2.5 < f567/f0 < 3.5$ Condition (1-2):

In the present embodiment, f567/f0 is greater than 2.5. Therefore, the power provided by the fifth lens 50, the sixth lens 60, and the seventh lens 70 is prevented from becoming weak. Accordingly, correction of each type of aberration, especially chromatic aberration, can be more favorably performed, and high optical performance can be achieved. Furthermore, as f567/f0 is lower than 3.5, the power provided by the fifth lens 50, the sixth lens 60, and the seventh lens 70 is prevented from becoming too strong. Accordingly, it is possible to avoid the total length of the entire lens system from becoming long.

Furthermore, in a case where a combined focal length of the fourth lens 40 and the fifth lens 50 is f45 (mm) and a focal length of the entire lens system is f0 (mm), the focal length f45 of the fourth lens 40 and the fifth lens 50 and the focal length f0 of the entire lens system meet Condition (2) below.

$1 < f45/f0 < 3$ Condition (2):

More specifically, the combined focal length f45 of the fourth lens 40 and the fifth lens 50 is 2.173, and the focal length f0 of the entire lens system is 1.320 mm. Therefore, as f45/f0 is 1.646, the above Condition (2) is met.

As described above, in the present embodiment, f45/f0 is greater than 1. Therefore, the power provided by the fourth lens 40 and the fifth lens 50 is prevented from becoming weak. Accordingly, correction of each type of aberration can be favorably performed, and high optical performance can be achieved. Furthermore, as f45/f0 is lower than 3, the power provided by the fourth lens 40 and the fifth lens 50 is prevented from becoming too strong. Accordingly, it is possible to avoid the total length of the entire lens system from becoming long.

Furthermore, in a case where: the first lens 10, the second lens 20, and the third lens 30 form a negative lens group; the fourth lens 40, the fifth lens 50, the sixth lens 60, and the seventh lens 70 form a positive lens group; and a combined focal length of the negative lens group is fN (mm) and a combined focal length of the positive lens group is fP (mm), then the combined focal length fN of the negative lens group and the combined focal length fP of the positive lens group meet a condition below.

$0.1 < |fN/fP| < 0.5$ Condition (3):

More specifically, the combined focal length fN of the negative lens group is −1.316, and the combined focal length fP of the positive lens group is 3.195. Therefore, as |fN/fP| is 0.412, the above Condition (3) is met.

As described above, in the present embodiment, |fN/fP| is greater than 0.1. Therefore, negative power provided by the negative lens group can be reduced. Accordingly, correction of field curvature and comatic aberration can be favorably performed. Furthermore, as |fN/fP| is lower than 0.5, it is possible to avoid the total length of the entire lens system from becoming long.

Furthermore, in a case where an object-to-image distance is d0 (mm) and a focal length of the entire lens system is f0 (mm), the object-to-image distance d0 and the focal length f0 of the entire lens system meet a condition below.

$8 < d0/f0 < 15$ Condition (4):

More specifically, the object-to-image distance d0 (mm) is 13.950, and the focal length f0 of the entire lens system is 1.320 mm. Therefore, as d0/f0 is 10.568, the above Condition (4) is met.

As described above, in the present embodiment, d0/f0 is greater than 8. Therefore, spherical aberration and distortion can be properly corrected. Furthermore, as d0/f0 is lower than 15, lens diameters are prevented from becoming too large, and it is possible to avoid the total length of the entire lens system from becoming long.

Furthermore, in a case where the abbe number of the sixth lens is ν6 and the abbe number of the seventh lens is ν7, the abbe numbers ν6 and ν7 respectively meet conditions below.

$$\nu6 \leq 30 \quad \text{Condition (5):}$$

$$50 \leq \nu7 \quad \text{Condition (6):}$$

More specifically, the abbe number ν6 is 24.0 and the abbe number ν7 is 55.8. Accordingly, the abbe numbers ν6 and ν7 respectively meet Conditions (5) and (6). Therefore, chromatic aberration can be properly corrected.

Embodiment 2

Figure 4:
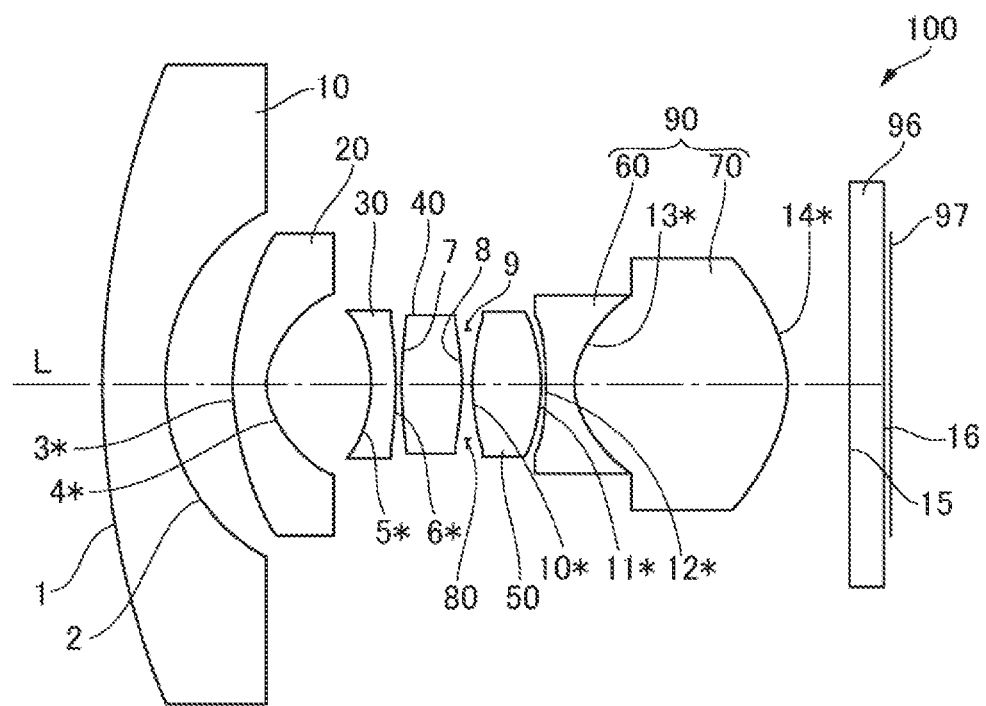
FIG. 4 is an explanatory diagram illustrating a configuration of a wide-angle lens according to Embodiment 2 of the present invention.
Figure 5A:
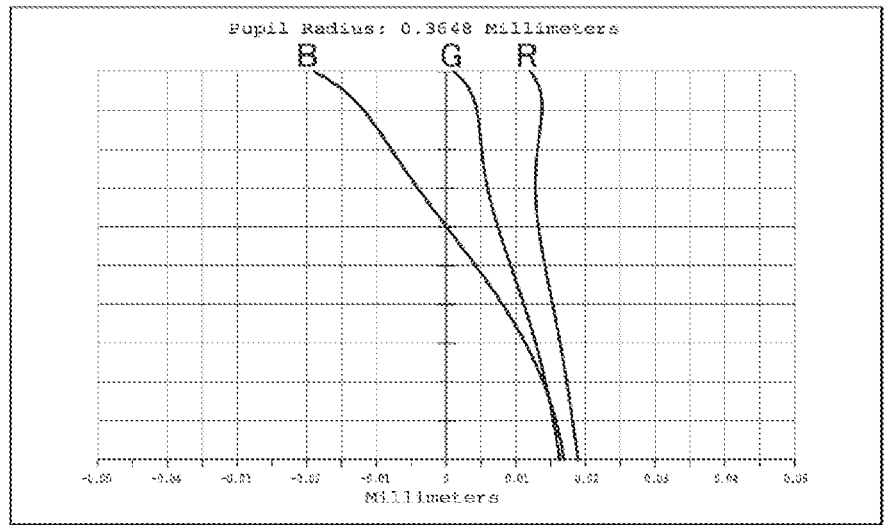
FIGS. 5(a) and 5(b) are explanatory diagrams illustrating spherical aberration and chromatic aberration of magnification of the wide-angle lens illustrated in FIG. 4.
Figure 5B:
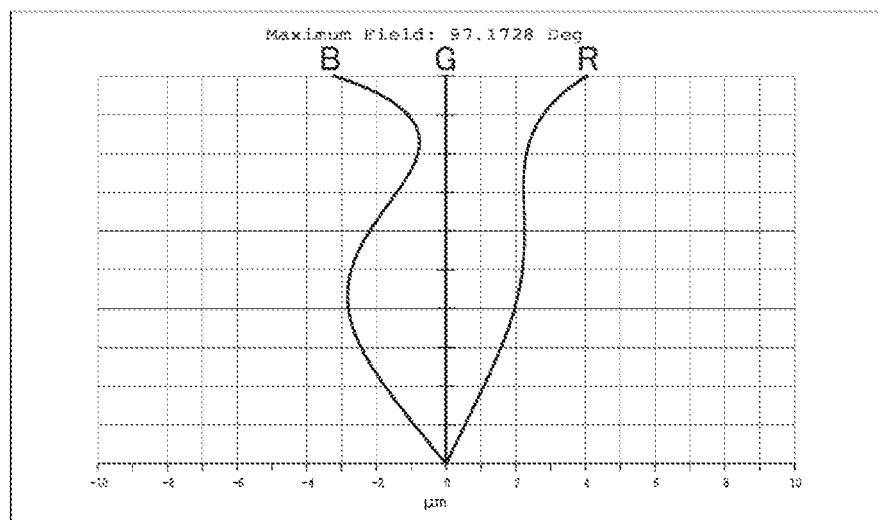
Figure 6A:
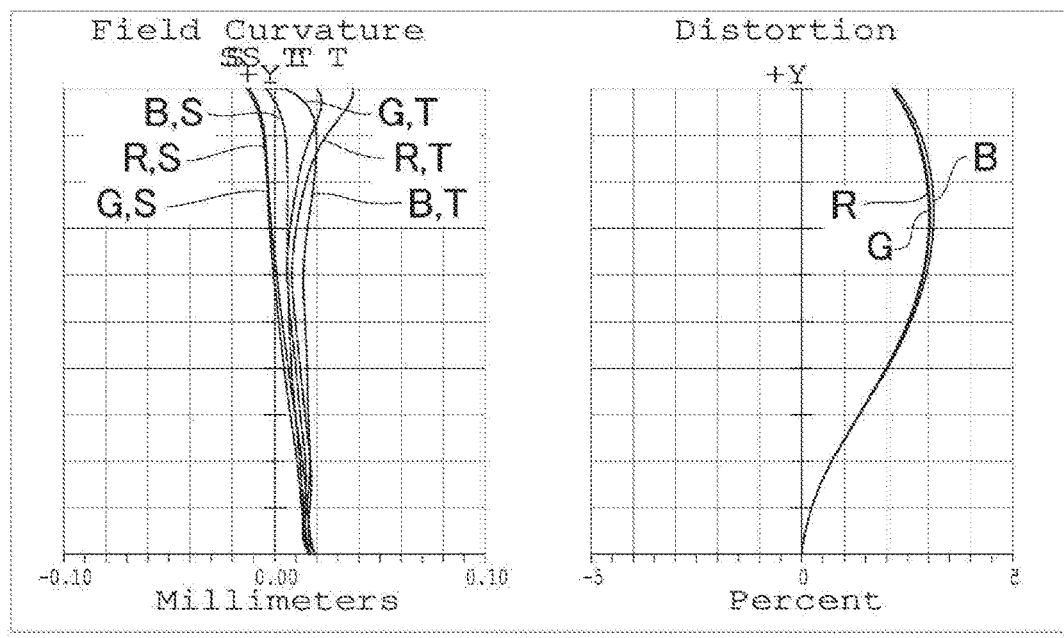
FIGS. 6(a) and 6(b) are explanatory diagrams illustrating astigmatism and transverse aberration of the wide-angle lens illustrated in FIG. 4.
Figure 6B:
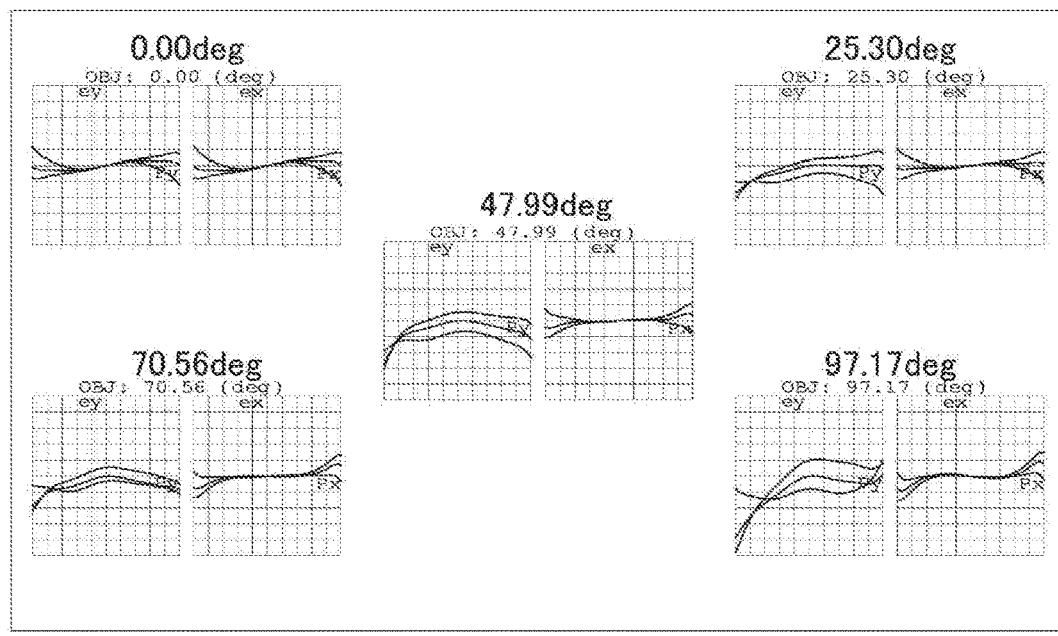

FIG. 4 is an explanatory diagram illustrating a configuration of a wide-angle lens 100 according to Embodiment 2 of the present invention. FIGS. 5(a) and 5(b) are explanatory diagrams illustrating spherical aberration and chromatic aberration of magnification of the wide-angle lens 100 illustrated in FIG. 4. Further, in FIGS. 5 (a) and 5(b), an aberration diagram of spherical aberration and an aberration diagram of chromatic aberration of magnification are illustrated. FIGS. 6(a) and 6(b) are explanatory diagrams illustrating astigmatism and transverse aberration of the wide-angle lens 100 illustrated in FIG. 4. Further, in FIGS. 6 (a) and 6(b), an aberration diagram of astigmatism and an aberration diagram of transverse aberration are illustrated. In FIG. 5 (a), spherical aberration in a case where the pupil radius (i.e., Pupil Radius) is 0.3648 mm is illustrated, and, in FIG. 5 (b), chromatic aberration of magnification in a case where the maximum field (i.e., Max. Field) is 97.1728 deg is illustrated. In FIG. 6 (b), transverse aberration in respective cases of angles of 0.00 deg, 25.30 deg, 47.99 deg, 70.56 deg, and 97.17 deg with respect to two directions (i.e., a Y axis direction and an X axis direction), which are orthogonal to an optical axis, are illustrated. Note that, as the basic configurations of wide-angle lenses 100 according to the present embodiment and the below-described Embodiments 3 and 4 are the same as Embodiment 1, the common parts are assigned the same reference signs so as to omit detailed explanation.

As illustrated in FIG. 4, the wide-angle lens 100 of the present embodiment, as with Embodiment 1, is configured with a first lens 10, a second lens 20, a third lens 30, a fourth lens 40, a diaphragm 80, a fifth lens 50, a sixth lens 60, and a seventh lens 70, which are arranged in this order from the object side. The first lens 10 is a negative meniscus lens whose convex surface faces the object side. The second lens 20 is a negative meniscus lens whose at least one surface is an aspherical surface and whose concave surface faces the image side. The third lens 30 is a negative meniscus lens whose at least one surface is an aspherical surface and whose concave surface faces the object side. The fourth lens 40 is a positive lens. The fifth lens 50 is a positive lens. The sixth lens 60 is a negative lens whose concave surface faces the image side. The seventh lens 70 is a double convex lens with positive power whose convex surfaces face both of the object side and the image side. The sixth lens 60 and the seventh lens 70 configure a joined lens 90, of which the surface of the sixth lens 60 on the image side and the surface of the seventh lens 70 on the object side are joined by use of a translucent resin material (unillustrated).

More specifically, with respect to the first lens 10, the surface (i.e., the first surface 1) on the object side is a spherical convex surface and the surface (i.e., the second surface 2) on the image side is a spherical concave surface. With respect to the second lens 20, the surface (i.e., the third surface 3) on the object side is an aspherical convex surface and the surface (i.e., the fourth surface 4) on the image side is an aspherical concave surface. With respect to the third lens 30, the surface (i.e., the fifth surface 5) on the object side is an aspherical concave surface and the surface (i.e., the sixth surface 6) on the image side is an aspherical convex surface. The fourth lens 40 is a double convex lens of which both of the surface (i.e., the seventh surface 7) on the object side and the surface (i.e., the eighth surface 8) on the image side are spherical convex surfaces. The fifth lens 50 is a double convex lens of which both of the surface (i.e., the tenth surface 10) on the object side and the surface (i.e., the eleventh surface 11) on the image side are aspherical convex surfaces. With respect to the sixth lens 60, the surface (i.e., the twelfth surface 12) on the object side is an aspherical concave surface and the surface (i.e., the thirteenth surface 13) on the image side is an aspherical concave surface. With respect to the seventh lens 70, the surface (i.e., the thirteenth surface 13) on the object side is an aspherical convex surface and the surface (i.e., the fourteenth surface 14) on the image side is an aspherical convex surface. The diaphragm 80 configures the ninth surface 9. Further, the surface of the filter 96 on the object side configures the fifteenth surface 15 and the surface of the filter 96 on the image side configures the sixteenth surface 16.

Here, at least one of the fourth lens 40 and the fifth lens 50 is a glass lens. In the present embodiment, one of the fourth lens 40 and the fifth lens 50 is a glass lens. More specifically, the fourth lens 40 is a glass lens and the fifth lens 50 is a plastic lens. Furthermore, the first lens 10 is a glass lens and each of the second lens 20, the third lens 30, the sixth lens 60, and the seventh lens 70 is a plastic lens.

The properties of the wide-angle lens 100 of the present embodiment are as indicated in Table 3, FIGS. 5(a) and 5(b), and FIGS. 6(a) and 6(b). Further, physical properties, aspheric coefficients, etc., of each surface are as indicated in Table 4.

TABLE 3

| Effective Focal Length (f0) | 1.457 mm |
|---|---|
| Total Track | 16.223 mm |
| Image Space F/# | 2.0 |
| Max. Field of Angle | 194 deg |
| Horizontal Field of Angle | 194 deg |

TABLE 4

| Surf | Radius | Thickness | Nd | vd | f |
|---|---|---|---|---|---|
| 1 | 16.000 | 1.300 | 1.773 | 49.9 | −7.003 |
| 2 | 3.900 | 1.375 | | | |
| 3* | 3.500 | 0.700 | 1.531 | 56.0 | −4.266 |
| 4* | 1.280 | 2.160 | | | |
| 5* | −2.400 | 0.510 | 1.531 | 56.0 | −6.304 |
| 6* | −9.100 | 0.110 | | | |
| 7 | 10.700 | 1.260 | 1.847 | 24.0 | 4.234 |
| 8 | −5.100 | 0.100 | | | |
| 9(stop) | Infinity | 0.090 | | | |
| 10* | 3.67 | 1.420 | 1.531 | 56.0 | 3.489 |
| 11* | −3.24 | 0.100 | | | |
| 12* | −8.000 | 0.600 | 1.635 | 24.2 | −1.638 |
| 13* | 1.230 | 4.390 | 1.531 | 56.0 | 2.694 |
| 14* | −2.085 | 1.283 | | | |
| 15 | Infinity | 0.700 | 1.517 | 64.1 | |
| 16 | Infinity | 0.125 | | | |

Aspheric Coefficient

| Surf | c (1/Radius) | K | A3 | A4 | A5 |
|---|---|---|---|---|---|
| 3 | 2.85714E−01 | 0.00000E+00 | 9.60000E−03 | −2.96000E−02 | 3.70000E−03 |
| 4 | 7.81250E−01 | −5.50000E−01 | 5.34000E−03 | −2.89000E−02 | −4.71000E−02 |
| 5 | −4.16667E−01 | −3.70000E−01 | 0.00000E+00 | −1.40000E−02 | 0.00000E+00 |
| 6 | −1.09890E−01 | 0.00000E+00 | 0.00000E+00 | −8.69000E−03 | 0.00000E+00 |
| 10 | 2.72480E−01 | 0.00000E+00 | 0.00000E+00 | −4.21000E−03 | 0.00000E+00 |
| 11 | −3.08642E−01 | −1.45000E+00 | 0.00000E+00 | −4.90000E−03 | 0.00000E+00 |
| 12 | −1.25000E−01 | 0.00000E+00 | 0.00000E+00 | −2.16000E−02 | 0.00000E+00 |
| 13 | 8.13008E−01 | −1.20000E+00 | 0.00000E+00 | −7.60000E−03 | 0.00000E+00 |
| 14 | −4.79616E−01 | −2.85000E+00 | 0.00000E+00 | −3.70000E−03 | 0.00000E+00 |

Aspheric Coefficient

| Surf | A6 | A7 | A8 |
|---|---|---|---|
| 3 | 1.37000E−03 | −7.00000E−05 | −6.06000E−05 |
| 4 | 5.67000E−02 | −3.13000E−02 | 6.68000E−03 |
| 5 | 5.04000E−03 | 0.00000E+00 | −7.40000E−04 |
| 6 | 5.75000E−03 | 0.00000E+00 | −3.53000E−04 |
| 10 | 1.47000E−03 | 0.00000E+00 | −8.25000E−04 |
| 11 | −2.22000E−03 | 0.00000E+00 | −7.79000E−04 |
| 12 | −2.61000E−03 | 0.00000E+00 | −4.50000E−04 |
| 13 | 6.32000E−03 | 0.00000E+00 | −6.31000E−04 |
| 14 | 1.08000E−04 | 0.00000E+00 | −1.49000E−05 |

As illustrated in Table 3, with respect to the wide-angle lens 100 of the present embodiment, the focal length f0 of the entire lens system is 1.457 mm; the object-to-image distance is 16.223 mm; the F-value of the entire lens system is 2.0; the maximum field angle is 194 deg; and the horizontal field angle is 194 deg.

As illustrated in Table 4, the abbe numbers vd of the second lens 20, the third lens 30, the fifth lens 50, and the seventh lens 70 are all greater than 50. More specifically, the abbe numbers vd of the second lens 20, the third lens 30, the fifth lens 50, and the seventh lens 70 are all 56.0, and the refractive indexes Nd of the second lens 20, the third lens 30, the fifth lens 50, and the seventh lens 70 are all 1.531. The refractive index Nd of the sixth lens 60 is 1.635, and therefore the sixth lens 60 and the seventh lens 70 differ in refractive indexes Nd.

As described above, the wide-angle lens 100 of the present embodiment has a lens configuration with seven lenses in six groups, of which five lenses among the seven lenses are plastic. Accordingly, it is possible to reduce cost of the wide-angle lens 100 as well as reducing size and weight. Furthermore, in the present embodiment, in accordance with arrangement of the third lens 30, which is a negative lens, it is possible to achieve a lens configuration with arrangement of the fourth lens 40 and the fifth lens 50, which are positive lenses, on both sides (i.e., the object side and the image side) of the diaphragm 80, respectively. Further, in the lens configuration, the sides of the diaphragm 80 are nearly symmetric. In addition, the fourth lens 40 and the fifth lens 50 are double convex lenses whose convex surfaces face both of the object side and the image side. Therefore, a configuration in which the sides, with reference to the diaphragm 80, are further symmetric. Accordingly, it is possible to achieve similar effects as Embodiment 1, such as reducing astigmatism and chromatic aberration of magnification at the peripheral section.

Furthermore, in a case where a combined focal length of the fifth lens 50, the sixth lens 60, and the seventh lens 70 is f567 (mm) and a focal length of the entire lens system is f0 (mm), the combined focal length f567 of the fifth lens 50, the sixth lens 60, and the seventh lens 70 and the focal length f0 of the entire lens system meet Condition (1) below.

$$2 < f567/f0 < 4$$ Condition (1):

More specifically, the combined focal length f567 of the fifth lens 50, the sixth lens 60, and the seventh lens 70 is 4.258 mm, and the focal length f0 of the entire lens system is 1.457 mm. Therefore, as f567/f0 is 2.923, the above Condition (1) is met.

As described above, in the present embodiment, f567/f0 is greater than 2. Therefore, the power provided by the fifth lens 50, the sixth lens 60, and the seventh lens 70 is prevented from becoming weak. Accordingly, correction of each type of aberration, especially chromatic aberration, can be favorably performed, and high optical performance can be achieved. Furthermore, as f567/f0 is lower than 4, the power provided by the fifth lens 50, the sixth lens 60, and the seventh lens 70 is prevented from becoming too strong. Accordingly, it is possible to avoid the total length of the entire lens system from becoming long.

Furthermore, it is further preferable that the combined focal length f567 of the fifth lens 50, the sixth lens 60, and the seventh lens 70 and the focal length f0 of the entire lens system meet Condition (1-2) below.

$$2.5<f567/f0<3.5 \qquad \text{Condition (1-2):}$$

In the present embodiment, f567/f0 is greater than 2.5. Therefore, the power provided by the fifth lens 50, the sixth lens 60, and the seventh lens 70 is prevented from becoming weak. Accordingly, correction of each type of aberration, especially chromatic aberration, can be more favorably performed, and high optical performance can be achieved. Furthermore, as f567/f0 is lower than 3.5, the power provided by the fifth lens 50, the sixth lens 60, and the seventh lens 70 is prevented from becoming too strong. Accordingly, it is possible to avoid the total length of the entire lens system from becoming long.

Furthermore, in a case where a combined focal length of the fourth lens 40 and the fifth lens 50 is f45 (mm) and a focal length of the entire lens system is f0 (mm), the focal length f45 of the fourth lens 40 and the fifth lens 50 and the focal length f0 of the entire lens system meet Condition (2) below.

$$1<f45/f0<3 \qquad \text{Condition (2):}$$

More specifically, the combined focal length f45 of the fourth lens 40 and the fifth lens 50 is 2.181, and the focal length f0 of the entire lens system is 1.457 mm. Therefore, as f45/f0 is 1.497, the above Condition (2) is met.

As described above, in the present embodiment, f45/f0 is greater than 1. Therefore, the power provided by the fourth lens 40 and the fifth lens 50 is prevented from becoming weak. Accordingly, correction of each type of aberration can be favorably performed, and high optical performance can be achieved. Furthermore, as f45/f0 is lower than 3, the power provided by the fourth lens 40 and the fifth lens 50 is prevented from becoming too strong. Accordingly, it is possible to avoid the total length of the entire lens system from becoming long.

Furthermore, in a case where: the first lens 10, the second lens 20, and the third lens 30 form a negative lens group; the fourth lens 40, the fifth lens 50, the sixth lens 60, and the seventh lens 70 form a positive lens group; and a combined focal length of the negative lens group is fN (mm) and a combined focal length of the positive lens group is fP (mm), then the combined focal length fN of the negative lens group and the combined focal length fP of the positive lens group meet a condition below.

$$0.1<|fN/fP|<0.5 \qquad \text{Condition (3):}$$

More specifically, the combined focal length fN of the negative lens group is −1.304, and the combined focal length fP of the positive lens group is 5.087. Therefore, as |fN/fP| is 0.256, the above Condition (3) is met.

As described above, in the present embodiment, |fN/fP| is greater than 0.1.

Therefore, negative power provided by the negative lens group can be reduced. Accordingly, correction of field curvature and comatic aberration can be favorably per-formed. Furthermore, as |fN/fP| is lower than 0.5, it is possible to avoid the total length of the entire lens system from becoming long.

Furthermore, in a case where an object-to-image distance is d0 (mm) and a focal length of the entire lens system is f0 (mm), the object-to-image distance d0 and the focal length f0 of the entire lens system meet a condition below.

$$8<d0/f0<15 \qquad \text{Condition (4):}$$

More specifically, the object-to-image distance d0 (mm) is 16.223, and the focal length f0 of the entire lens system is 1.457 mm. Therefore, as d0/f0 is 11.134, the above Condition (4) is met.

As described above, in the present embodiment, d0/f0 is greater than 8. Therefore, spherical aberration and distortion can be properly corrected. Furthermore, as d0/f0 is lower than 15, lens diameters are prevented from becoming too large, and it is possible to avoid the total length of the entire lens system from becoming long.

Furthermore, in a case where the abbe number of the sixth lens is v6 and the abbe number of the seventh lens is v7, the abbe numbers v6 and v7 respectively meet conditions below.

$$v6≤30 \qquad \text{Condition (5):}$$

$$50≤v7 \qquad \text{Condition (6):}$$

More specifically, the abbe number v6 is 24.2 and the abbe number v7 is 56.0. Accordingly, the abbe numbers v6 and v7 respectively meet Conditions (5) and (6). Therefore, chromatic aberration can be properly corrected.

Embodiment 3

Figure 7:
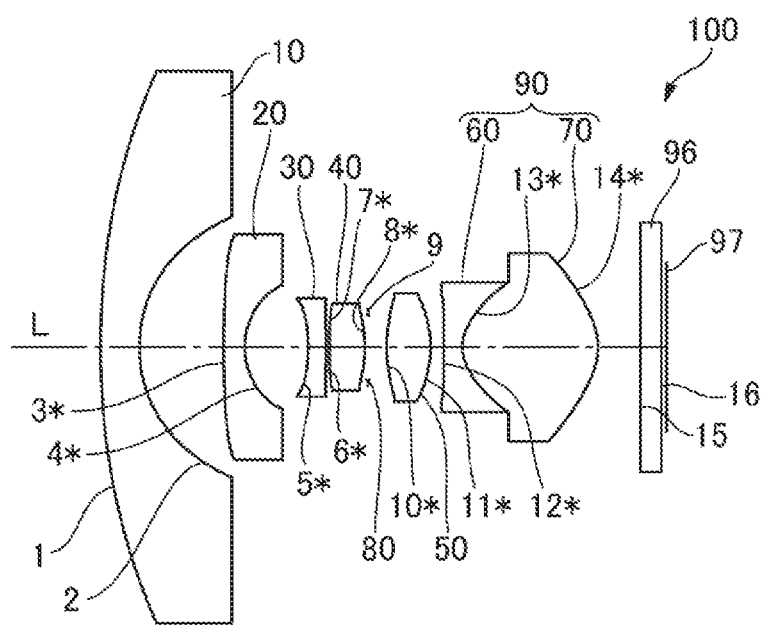
FIG. 7 is an explanatory diagram illustrating a configuration of a wide-angle lens according to Embodiment 3 of the present invention.
Figure 8A:
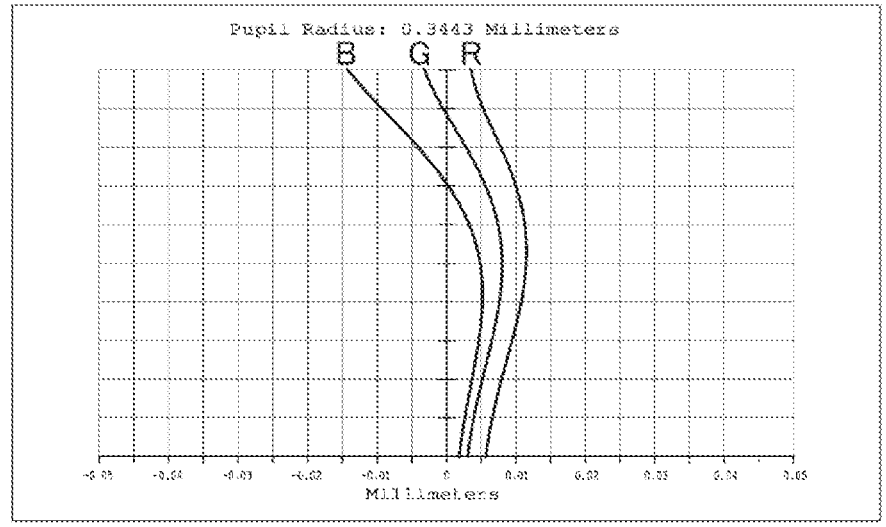
FIGS. 8(a) and 8(b) are explanatory diagrams illustrating spherical aberration and chromatic aberration of magnification of the wide-angle lens illustrated in FIG. 7.
Figure 8B:
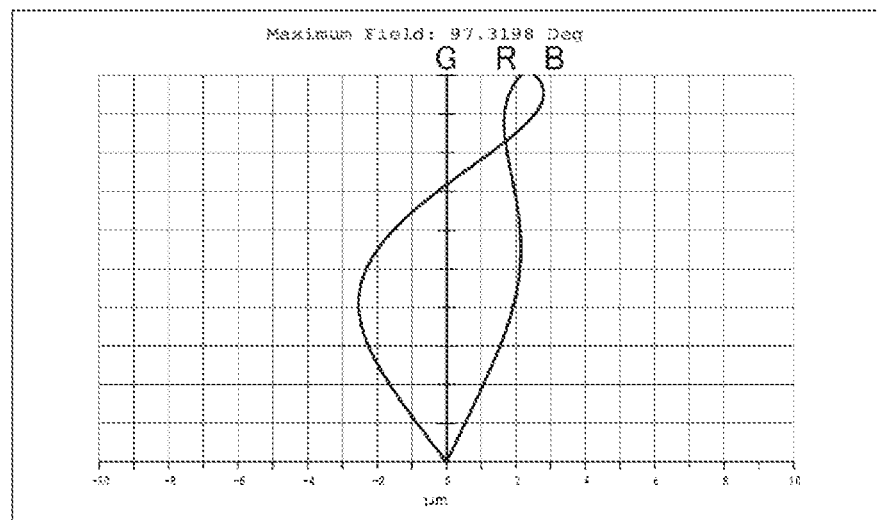
Figure 9A:
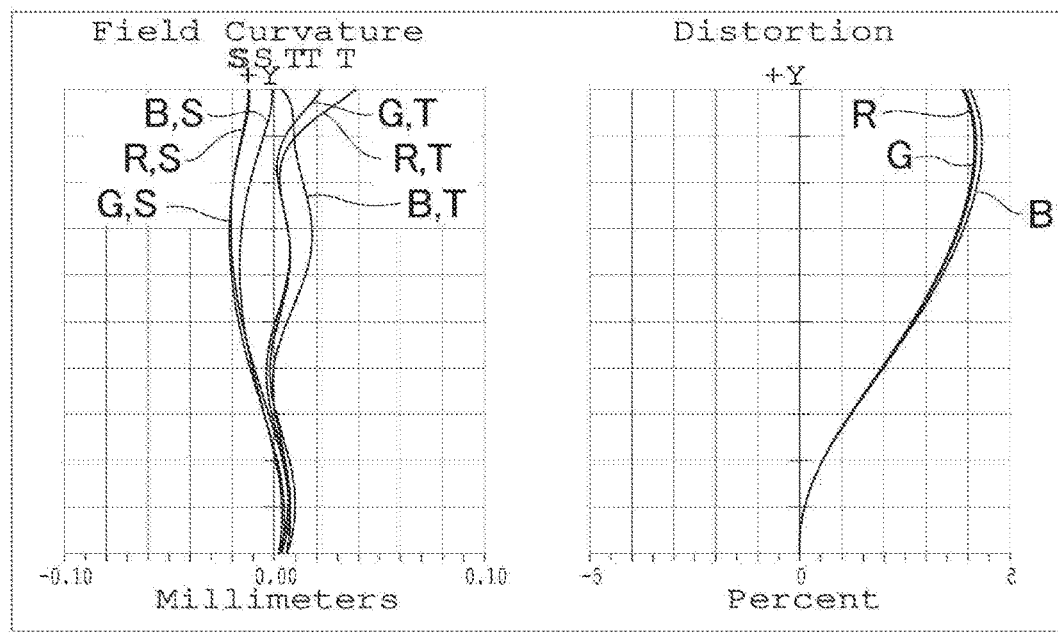
FIGS. 9(a) and 9(b) are explanatory diagrams illustrating astigmatism and transverse aberration of the wide-angle lens illustrated in FIG. 7.
Figure 9B:
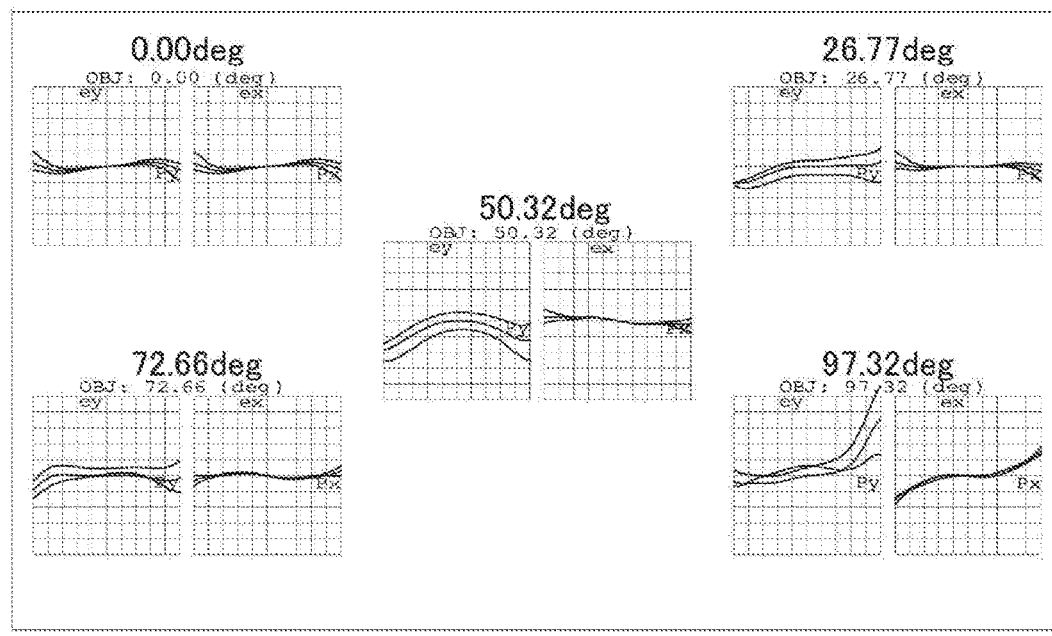

FIG. 7 is an explanatory diagram illustrating a configuration of a wide-angle lens 100 according to Embodiment 3 of the present invention. FIGS. 8(*a*) and 8(*b*) are explanatory diagrams illustrating spherical aberration and chromatic aberration of magnification of the wide-angle lens 100 illustrated in FIG. 7. Further, in FIGS. 8 (*a*) and 8(*b*), an aberration diagram of spherical aberration and an aberration diagram of chromatic aberration of magnification are illustrated. FIGS. 9(*a*) and 9(*b*) are explanatory diagrams illustrating astigmatism and transverse aberration of the wide-angle lens 100 illustrated in FIG. 7. Further, in FIGS. 9 (*a*) and 9(*b*), an aberration diagram of astigmatism and an aberration diagram of transverse aberration are illustrated. In FIG. 8 (*a*), spherical aberration in a case where the pupil radius (i.e., Pupil Radius) is 0.3443 mm is illustrated, and, in FIG. 8 (*b*), chromatic aberration of magnification in a case where the maximum field (i.e., Max. Field) is 97.3198 deg is illustrated. In FIG. 9 (*b*), transverse aberration in respective cases of angles of 0.00 deg, 26.77 deg, 50.32 deg, 72.66 deg, and 97.32 deg with respect to two directions (i.e., a Y axis direction and an X axis direction), which are orthogonal to an optical axis, are illustrated.

As illustrated in FIG. 7, the wide-angle lens 100 of the present embodiment, as with Embodiment 1, is configured with a first lens 10, a second lens 20, a third lens 30, a fourth lens 40, a diaphragm 80, a fifth lens 50, a sixth lens 60, and a seventh lens 70, which are arranged in this order from the object side. The first lens 10 is a negative meniscus lens whose convex surface faces the object side. The second lens 20 is a negative meniscus lens whose at least one surface is an aspherical surface and whose concave surface faces the image side. The third lens 30 is a negative meniscus lens whose at least one surface is an aspherical surface and whose concave surface faces the object side. The fourth lens 40 is a positive lens. The fifth lens 50 is a positive lens. The sixth lens 60 is a negative lens whose concave surface faces the image side. The seventh lens 70 is a double convex lens with positive power whose convex surfaces face both of the object side and the image side. The sixth lens 60 and the seventh lens 70 configure a joined lens 90, of which the surface of the sixth lens 60 on the image side and the surface of the seventh lens 70 on the object side are joined by use of a translucent resin material (unillustrated).

More specifically, with respect to the first lens 10, the surface (i.e., the first surface 1) on the object side is a spherical convex surface and the surface (i.e., the second surface 2) on the image side is a spherical concave surface. With respect to the second lens 20, the surface (i.e., the third surface 3) on the object side is an aspherical convex surface and the surface (i.e., the fourth surface 4) on the image side is an aspherical concave surface. With respect to the third lens 30, the surface (i.e., the fifth surface 5) on the object side is an aspherical concave surface and the surface (i.e., the sixth surface 6) on the image side is an aspherical convex surface. The fourth lens 40 is a double convex lens of which both of the surface (i.e., the seventh surface 7) on the object side and the surface (i.e., the eighth surface 8) on the image side are aspherical convex surfaces. The fifth lens 50 is a double convex lens of which both of the surface (i.e., the tenth surface 10) on the object side and the surface (i.e., the eleventh surface 11) on the image side are aspherical convex surfaces. With respect to the sixth lens 60, the surface (i.e., the twelfth surface 12) on the object side is an aspherical concave surface and the surface (i.e., the thirteenth surface 13) on the image side is an aspherical concave surface. With respect to the seventh lens 70, the surface (i.e., the thirteenth surface 13) on the object side is an aspherical convex surface and the surface (i.e., the fourteenth surface 14) on the image side is an aspherical convex surface. The diaphragm 80 configures the ninth surface 9. Further, the surface of the filter 96 on the object side configures the fifteenth surface 15 and the surface of the filter 96 on the image side configures the sixteenth surface 16.

In the present embodiment, all of the first lens 10, the second lens 20, the third lens 30, the fourth lens 40, the fifth lens 50, the sixth lens 60, and the seventh lens 70 are plastic lenses.

The properties of the wide-angle lens 100 of the present embodiment are as indicated in Table 5, FIGS. 8(*a*) and 8(*b*), and FIGS. 9(*a*) and 9(*b*). Further, physical properties, aspheric coefficients, etc., of each surface are as indicated in Table 6.

TABLE 5

| Effective Focal Length (f0) | 1.377 mm |
|---|---|
| Total Track | 18.715 mm |
| Image Space F/# | 2.0 |
| Max. Field of Angle | 195 deg |
| Horizontal Field of Angle | 195 deg |

TABLE 6

| Surf | Radius | Thickness | Nd | vd | f |
|---|---|---|---|---|---|
| 1 | 22.000 | 1.300 | 1.491 | 58.3 | −10.092 |
| 2 | 3.965 | 2.800 | | | |
| 3* | 35.940 | 0.700 | 1.531 | 56.0 | −4.159 |
| 4* | 2.067 | 2.120 | | | |
| 5* | −2.980 | 0.550 | 1.531 | 56.0 | −6.926 |
| 6* | −16.700 | 0.100 | | | |
| 7* | 17.140 | 1.190 | 1.635 | 24.2 | 5.533 |
| 8* | −4.300 | 0.100 | | | |
| 9(stop) | Infinity | 0.617 | | | |
| 10* | 6.58 | 1.460 | 1.531 | 56.0 | 4.231 |
| 11* | −3.15 | 0.433 | | | |
| 12* | −1510.000 | 0.600 | 1.635 | 24.2 | −2.203 |
| 13* | 1.400 | 4.500 | 1.531 | 56.0 | 2.835 |
| 14* | −2.290 | 1.420 | | | |
| 15 | Infinity | 0.700 | 1.517 | 64.1 | |
| 16 | Infinity | 0.125 | | | |

| Aspheric Coefficient | | | | | |
|---|---|---|---|---|---|
| Surf | c (1/Radius) | K | A3 | A4 | A5 |
| 3 | 2.78242E−02 | 0.00000E+00 | −3.19400E−03 | 7.44400E−04 | 5.04600E−04 |
| 4 | 4.83793E−01 | −3.21000E−01 | 0.00000E+00 | −1.57200E−02 | 0.00000E+00 |
| 5 | −3.35570E−01 | 0.00000E+00 | 0.00000E+00 | −4.63900E−03 | 0.00000E+00 |
| 6 | −5.98802E−02 | −1.76500E−02 | 0.00000E+00 | 7.42000E−03 | 0.00000E+00 |
| 7 | 5.83431E−02 | −1.36700E+00 | 0.00000E+00 | 2.67900E−03 | 0.00000E+00 |
| 8 | −2.32558E−01 | 0.00000E+00 | 0.00000E+00 | 8.80600E−03 | 0.00000E+00 |
| 10 | 1.51976E−01 | 0.00000E+00 | 0.00000E+00 | 2.18400E−03 | 0.00000E+00 |
| 11 | −3.17460E−01 | 0.00000E+00 | 0.00000E+00 | 1.43400E−03 | 0.00000E+00 |
| 12 | −6.62252E−04 | 0.00000E+00 | 0.00000E+00 | −8.46700E−03 | 0.00000E+00 |
| 13 | 7.14286E−01 | −8.69000E−01 | 0.00000E+00 | −4.02300E−03 | 0.00000E+00 |
| 14 | −4.36681E−01 | −2.94500E+00 | 0.00000E+00 | −2.83800E−03 | 0.00000E+00 |

| Surf | A6 | A7 | A8 | A9 | A10 |
|---|---|---|---|---|---|
| 3 | −1.14300E−04 | 2.25200E−05 | −2.67500E−06 | 0.00000E+00 | 0.00000E+00 |
| 4 | 3.38400E−03 | 0.00000E+00 | −9.34100E−04 | 0.00000E+00 | 4.77600E−05 |
| 5 | 2.86200E−03 | 0.00000E+00 | −2.19200E−04 | 0.00000E+00 | 4.08300E−06 |
| 6 | 3.17600E−03 | 0.00000E+00 | 6.79300E−04 | 0.00000E+00 | 6.23400E−05 |
| 7 | 1.97800E−03 | 0.00000E+00 | 7.34600E−04 | 0.00000E+00 | 4.26300E−05 |

TABLE 6-continued

| 8  | 2.75300E−04  | 0.00000E+00 | 4.90900E−04 | 0.00000E+00 | 0.00000E+00  |
| 10 | 5.37500E−04  | 0.00000E+00 | 2.29200E−05 | 0.00000E+00 | 0.00000E+00  |
| 11 | 1.16700E−03  | 0.00000E+00 | 8.61200E−05 | 0.00000E+00 | −3.36500E−08 |
| 12 | 3.61800E−04  | 0.00000E+00 | 7.73900E−05 | 0.00000E+00 | −2.62400E−05 |
| 13 | −1.56900E−03 | 0.00000E+00 | 3.78300E−04 | 0.00000E+00 | −1.77900E−05 |
| 14 | 2.60000E−05  | 0.00000E+00 | 2.60800E−05 | 0.00000E+00 | −1.80500E−06 |

As illustrated in Table 5, with respect to the wide-angle lens 100 of the present embodiment, the focal length f0 of the entire lens system is 1.377 mm; the object-to-image distance is 18.715 mm; the F-value of the entire lens system is 2.0; the maximum field angle is 195 deg; and the horizontal field angle is 195 deg.

As illustrated in Table 6, the abbe numbers vd of the second lens 20, the third lens 30, the fifth lens 50, and the seventh lens 70 are all greater than 50. More specifically, the abbe numbers vd of the second lens 20, the third lens 30, the fifth lens 50, and the seventh lens 70 are all 56.0, and the refractive indexes Nd of the second lens 20, the third lens 30, the fifth lens 50, and the seventh lens 70 are all 1.531. The refractive index Nd of the sixth lens 60 is 1.635, and therefore the sixth lens 60 and the seventh lens 70 differ in refractive indexes Nd.

As described above, the wide-angle lens 100 of the present embodiment has a lens configuration with seven lenses in six groups, of which all of the seven lenses are plastic. Accordingly, it is possible to reduce cost of the wide-angle lens 100 as well as reducing size and weight. Furthermore, in the present embodiment, in accordance with arrangement of the third lens 30, which is a negative lens, it is possible to achieve a lens configuration with arrangement of the fourth lens 40 and the fifth lens 50, which are positive lenses, on both sides (i.e., the object side and the image side) of the diaphragm 80, respectively. Further, in the lens configuration, the sides of the diaphragm 80 are nearly symmetric. In addition, the fourth lens 40 and the fifth lens 50 are double convex lenses whose convex surfaces face both of the object side and the image side. Therefore, a configuration in which the sides, with reference to the diaphragm 80, are further symmetric. Accordingly, it is possible to reduce astigmatism and chromatic aberration of magnification at the peripheral section. Thus, even in a case of employing an imaging element 97 with a small pixel size, it is possible to reduce decrease in a light amount, change in a color balance, etc.

Furthermore, in accordance with arrangement of the third lens 30, which is a negative lens, it is possible to divide negative power in front of the fourth lens 40 with the first lens 10, the second lens 20, and the third lens 30. Thus, regarding the first lens 10, depth of the concave surface (i.e., the second surface 2) on the image side can be shallow, and therefore the first lens 10 is easily manufactured. Particularly, as described in the present embodiment, even in a case where the first lens 10 is a glass lens, the first lens 10 is easily manufactured because, regarding the first lens 10, depth of the concave surface (i.e., the second surface 2) on the image side can be shallow.

Furthermore, in accordance with arrangement of the fifth lens 50, which is a positive lens, an angle of incidence to the imaging surface can be relatively small.

Furthermore, the abbe numbers vd of the second lens 20, the third lens 30, the fifth lens 50, and the seventh lens 70 are all greater than 50, and therefore chromatic dispersion is small. In addition, each of the first lens 10, the second lens 20, and the third lens 30 is a meniscus lens, with which axial chromatic aberration is offset by a surface on the object side and a surface on the image side. Accordingly, axial chromatic aberration of the wide-angle lens 100 is small.

Furthermore, both surfaces of the second lens 20, the third lens 30, the fourth lens 40, the fifth lens 50, the sixth lens 60, and the seventh lens 70 are all aspherical surfaces, and therefore aberration such as spherical aberration can be reduced.

Furthermore, in a case where a combined focal length of the fifth lens 50, the sixth lens 60, and the seventh lens 70 is f567 (mm) and a focal length of the entire lens system is f0 (mm), the combined focal length f567 of the fifth lens 50, the sixth lens 60, and the seventh lens 70 and the focal length f0 of the entire lens system meet Condition (1) below.

$2 < f567/f0 < 4$  Condition (1):

More specifically, the combined focal length f567 of the fifth lens 50, the sixth lens 60, and the seventh lens 70 is 4.385 mm, and the focal length f0 of the entire lens system is 1.377 mm. Therefore, as f567/f0 is 3.185, the above Condition (1) is met.

As described above, in the present embodiment, f567/f0 is greater than 2. Therefore, the power provided by the fifth lens 50, the sixth lens 60, and the seventh lens 70 is prevented from becoming weak. Accordingly, correction of each type of aberration, especially chromatic aberration, can be favorably performed, and high optical performance can be achieved. Furthermore, as f567/f0 is lower than 4, the power provided by the fifth lens 50, the sixth lens 60, and the seventh lens 70 is prevented from becoming too strong. Accordingly, it is possible to avoid the total length of the entire lens system from becoming long.

Furthermore, it is further preferable that the combined focal length f567 of the fifth lens 50, the sixth lens 60, and the seventh lens 70 and the focal length f0 of the entire lens system meet Condition (1-2) below.

$2.5 < f567/f0 < 3.5$  Condition (1-2):

In the present embodiment, f567/f0 is greater than 2.5. Therefore, the power provided by the fifth lens 50, the sixth lens 60, and the seventh lens 70 is prevented from becoming weak. Accordingly, correction of each type of aberration, especially chromatic aberration, can be more favorably performed, and high optical performance can be achieved. Furthermore, as f567/f0 is lower than 3.5, the power provided by the fifth lens 50, the sixth lens 60, and the seventh lens 70 is prevented from becoming too strong. Accordingly, it is possible to avoid the total length of the entire lens system from becoming long.

Furthermore, in a case where a combined focal length of the fourth lens 40 and the fifth lens 50 is f45 (mm) and a focal length of the entire lens system is f0 (mm), the focal length f45 of the fourth lens 40 and the fifth lens 50 and the focal length f0 of the entire lens system meet Condition (2) below.

$1 < f45/f0 < 3$  Condition (2):

More specifically, the combined focal length f45 of the fourth lens 40 and the fifth lens 50 is 2.849, and the focal length f0 of the entire lens system is 1.377 mm. Therefore, as f45/f0 is 2.069, the above Condition (2) is met.

As described above, in the present embodiment, f45/f0 is greater than 1. Therefore, the power provided by the fourth lens 40 and the fifth lens 50 is prevented from becoming weak. Accordingly, correction of each type of aberration can be favorably performed, and high optical performance can be achieved. Furthermore, as f45/f0 is lower than 3, the power provided by the fourth lens 40 and the fifth lens 50 is prevented from becoming too strong. Accordingly, it is possible to avoid the total length of the entire lens system from becoming long.

Furthermore, in a case where: the first lens 10, the second lens 20, and the third lens 30 form a negative lens group; the fourth lens 40, the fifth lens 50, the sixth lens 60, and the seventh lens 70 form a positive lens group; and a combined focal length of the negative lens group is fN (mm) and a combined focal length of the positive lens group is fP (mm), then the combined focal length fN of the negative lens group and the combined focal length fP of the positive lens group meet a condition below.

$$0.1<|fN/fP|<0.5 \quad \text{Condition (3):}$$

More specifically, the combined focal length fN of the negative lens group is −1.385, and the combined focal length fP of the positive lens group is 5.571. Therefore, as |fN/fP| is 0.249, the above Condition (3) is met.

As described above, in the present embodiment, |fN/fP| is greater than 0.1. Therefore, negative power provided by the negative lens group can be reduced. Accordingly, correction of field curvature and comatic aberration can be favorably performed. Furthermore, as |fN/fP| is lower than 0.5, it is possible to avoid the total length of the entire lens system from becoming long.

Furthermore, in a case where an object-to-image distance is d0 (mm) and a focal length of the entire lens system is f0 (mm), the object-to-image distance d0 and the focal length f0 of the entire lens system meet a condition below.

$$8<d0/f0<15 \quad \text{Condition (4):}$$

More specifically, the object-to-image distance d0 (mm) is 18.715, and the focal length f0 of the entire lens system is 1.377 mm. Therefore, as d0/f0 is 13.594, the above Condition (4) is met.

As described above, in the present embodiment, d0/f0 is greater than 8. Therefore, spherical aberration and distortion can be properly corrected. Furthermore, as d0/f0 is lower than 15, lens diameters are prevented from becoming too large, and it is possible to avoid the total length of the entire lens system from becoming long.

Furthermore, in a case where the abbe number of the sixth lens is ν6 and the abbe number of the seventh lens is ν7, the abbe numbers ν6 and ν7 respectively meet conditions below.

$$\nu6 \leq 30 \quad \text{Condition (5):}$$

$$50 \leq \nu7 \quad \text{Condition (6):}$$

More specifically, the abbe number ν6 is 24.2 and the abbe number ν7 is 56.0. Accordingly, the abbe numbers ν6 and ν7 respectively meet Conditions (5) and (6). Therefore, chromatic aberration can be properly corrected.

Embodiment 4

Figure 10:
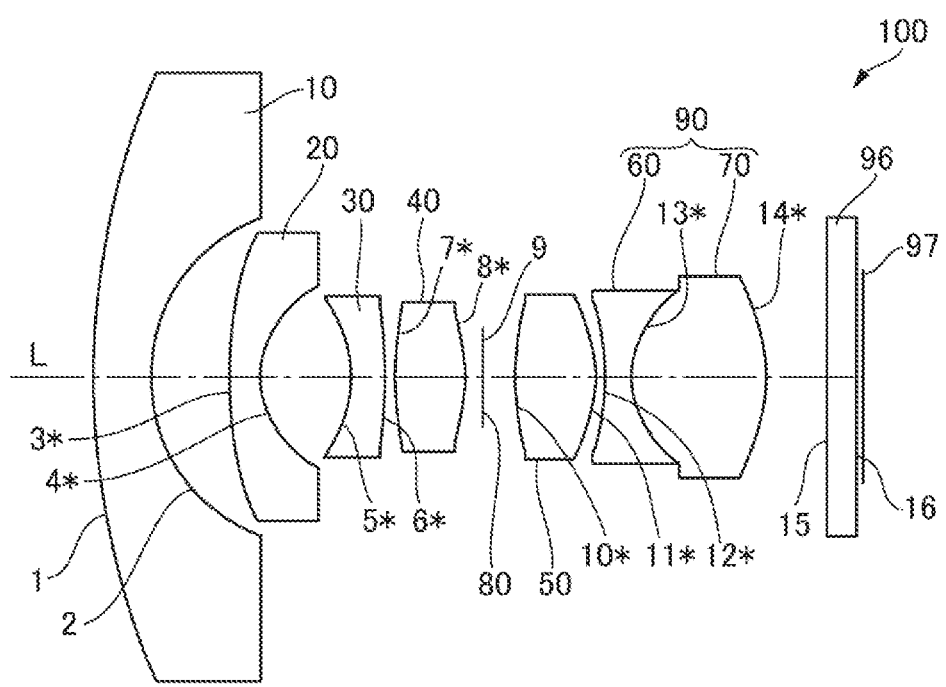
FIG. 10 is an explanatory diagram illustrating a configuration of a wide-angle lens according to Embodiment 4 of the present invention.
Figure 11A:
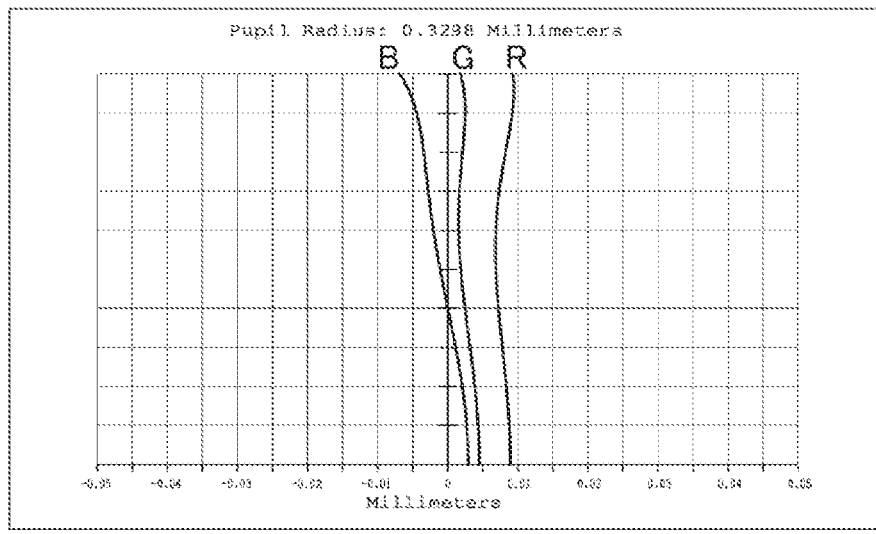
FIGS. 11(a) and 11(b) are explanatory diagrams illustrating spherical aberration and chromatic aberration of magnification of the wide-angle lens illustrated in FIG. 10.
Figure 11B:
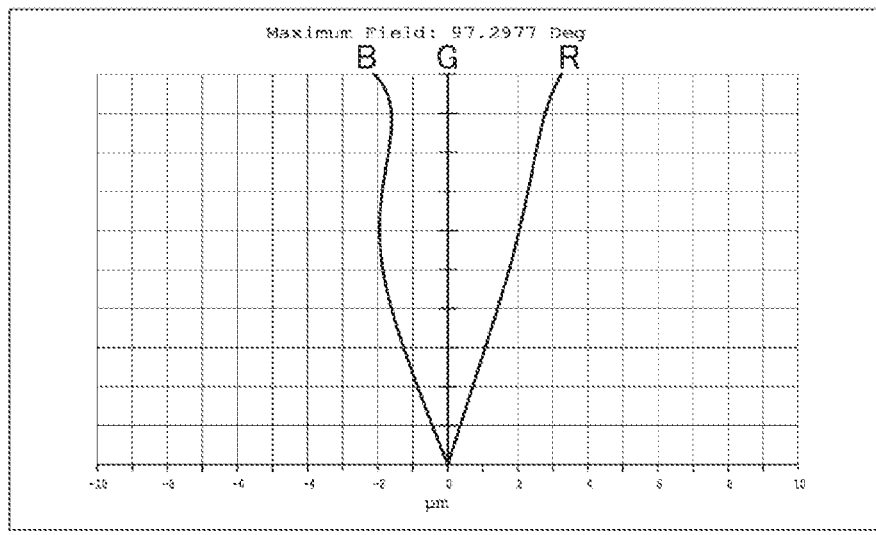
Figure 12A:
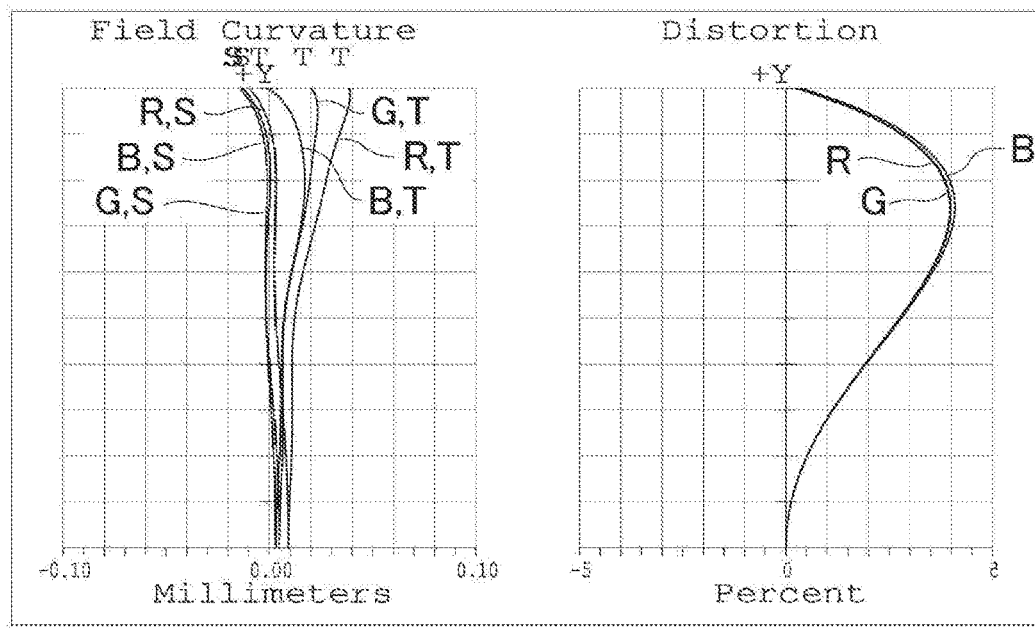
FIGS. 12(a) and 12(b) are explanatory diagrams illustrating astigmatism and transverse aberration of the wide-angle lens illustrated in FIG. 10.
Figure 12B:
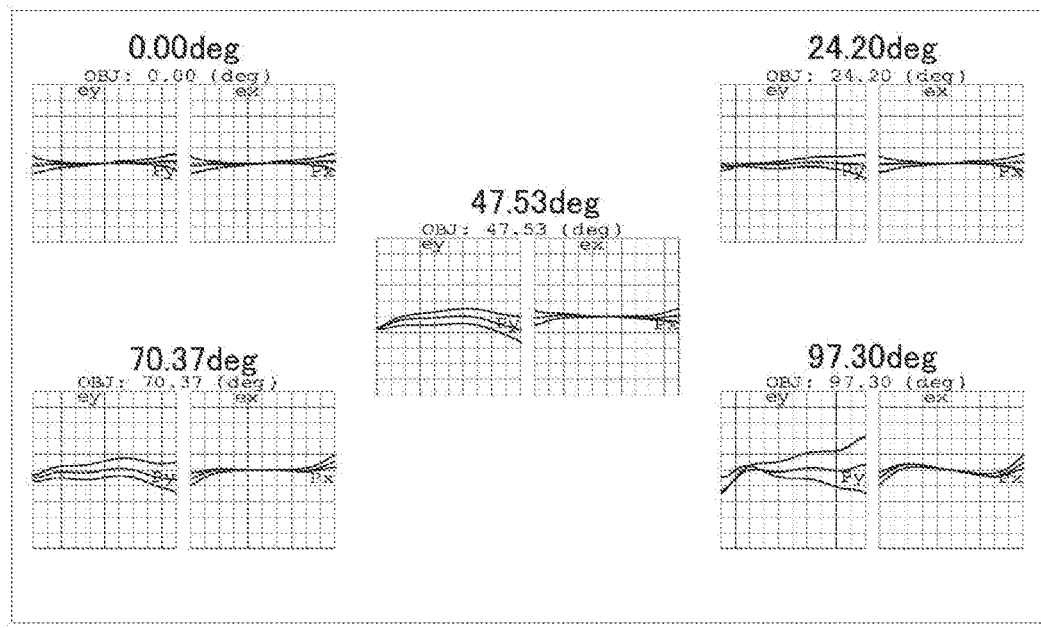

FIG. 10 is an explanatory diagram illustrating a configuration of a wide-angle lens 100 according to Embodiment 4 of the present invention. FIGS. 11(*a*) and 11(*b*) are explanatory diagrams illustrating spherical aberration and chromatic aberration of magnification of the wide-angle lens 100 illustrated in FIG. 10. Further, in FIGS. 11 (*a*) and 11(*b*), an aberration diagram of spherical aberration and an aberration diagram of chromatic aberration of magnification are illustrated. FIGS. 12(*a*) and 12(*b*) are explanatory diagrams illustrating astigmatism and transverse aberration of the wide-angle lens 100 illustrated in FIG. 10. Further, in FIGS. 12 (*a*) and 12(*b*), an aberration diagram of astigmatism and an aberration diagram of transverse aberration are illustrated. In FIG. 11 (*a*), spherical aberration in a case where the pupil radius (i.e., Pupil Radius) is 0.3298 mm is illustrated, and, in FIG. 11 (*b*), chromatic aberration of magnification in a case where the maximum field (i.e., Max. Field) is 97.2977 deg is illustrated. In FIG. 12 (*b*), transverse aberration in respective cases of angles of 0.00 deg, 24.20 deg, 47.53 deg, 70.37 deg, and 97.30 deg with respect to two directions (i.e., a Y axis direction and an X axis direction), which are orthogonal to an optical axis, are illustrated.

As illustrated in FIG. 10, the wide-angle lens 100 of the present embodiment, as with Embodiment 1, is configured with a first lens 10, a second lens 20, a third lens 30, a fourth lens 40, a diaphragm 80, a fifth lens 50, a sixth lens 60, and a seventh lens 70, which are arranged in this order from the object side. The first lens 10 is a negative meniscus lens whose convex surface faces the object side. The second lens 20 is a negative meniscus lens whose at least one surface is an aspherical surface and whose concave surface faces the image side. The third lens 30 is a negative meniscus lens whose at least one surface is an aspherical surface and whose concave surface faces the object side. The fourth lens 40 is a positive lens. The fifth lens 50 is a positive lens. The sixth lens 60 is a negative lens whose concave surface faces the image side. The seventh lens 70 is a double convex lens with positive power whose convex surfaces face both of the object side and the image side. The sixth lens 60 and the seventh lens 70 configure a joined lens 90, of which the surface of the sixth lens 60 on the image side and the surface of the seventh lens 70 on the object side are joined by use of a translucent resin material (unillustrated).

More specifically, with respect to the first lens 10, the surface (i.e., the first surface 1) on the object side is a spherical convex surface and the surface (i.e., the second surface 2) on the image side is a spherical concave surface. With respect to the second lens 20, the surface (i.e., the third surface 3) on the object side is an aspherical convex surface and the surface (i.e., the fourth surface 4) on the image side is an aspherical concave surface. With respect to the third lens 30, the surface (i.e., the fifth surface 5) on the object side is an aspherical concave surface and the surface (i.e., the sixth surface 6) on the image side is an aspherical convex surface. The fourth lens 40 is a double convex lens of which both of the surface (i.e., the seventh surface 7) on the object side and the surface (i.e., the eighth surface 8) on the image side are aspherical convex surfaces. The fifth lens 50 is a double convex lens of which both of the surface (i.e., the tenth surface 10) on the object side and the surface (i.e., the eleventh surface 11) on the image side are aspherical convex surfaces. With respect to the sixth lens 60, the surface (i.e., the twelfth surface 12) on the object side is an aspherical concave surface and the surface (i.e., the thirteenth surface 13) on the image side is an aspherical concave surface. With respect to the seventh lens 70, the surface (i.e., the thirteenth surface 13) on the object side is an aspherical convex surface and the surface (i.e., the fourteenth surface 14) on the image side is an aspherical convex surface. The diaphragm 80 configures the ninth surface 9. Further, the surface of the filter 96 on the object side configures the fifteenth surface 15 and the surface of the filter 96 on the image side configures the sixteenth surface 16.

In the present embodiment, the first lens 10 and the fourth lens are glass lenses, and the second lens 20, the third lens 30, the fifth lens 50, the sixth lens 60, and the seventh lens 70 are plastic lenses.

The properties of the wide-angle lens 100 of the present embodiment are as indicated in Table 7, FIGS. 11(a) and 11(b), and FIGS. 12(a) and 12(b). Further, physical properties, aspheric coefficients, etc., of each surface are as indicated in Table 8.

TABLE 7

| | |
|---|---|
| Effective Focal Length (f0) | 1.315 mm |
| Total Track | 17.370 mm |
| Image Space F/# | 2.0 |
| Max. Field of Angle | 195 deg |
| Horizontal Field of Angle | 195 deg |

TABLE 8

| Surf | Radius | Thickness | Nd | vd | f |
|---|---|---|---|---|---|
| 1 | 16.485 | 1.300 | 1.773 | 49.9 | −6.437 |
| 2 | 3.689 | 1.750 | | | |
| 3* | 9.928 | 0.700 | 1.531 | 56.0 | −4.547 |
| 4* | 1.895 | 2.060 | | | |
| 5* | −2.762 | 0.767 | 1.531 | 56.0 | −7.783 |
| 6* | −9.126 | 0.232 | | | |
| 7* | 7.178 | 1.573 | 1.583 | 30.4 | 4.835 |
| 8* | −4.261 | 0.390 | | | |
| 9(stop) | Infinity | 0.740 | | | |
| 10* | 5.264 | 1.825 | 1.619 | 64.1 | 3.413 |
| 11* | −3.06 | 0.202 | | | |
| 12* | −5.909 | 0.586 | 1.635 | 24.2 | −2.243 |
| 13* | 1.949 | 3.064 | 1.531 | 56.0 | 2.881 |
| 14* | −3.240 | 1.356 | | | |
| 15 | Infinity | 0.700 | 1.517 | 64.1 | |
| 16 | Infinity | 0.125 | | | |

| Aspheric Coefficient | | | | | |
|---|---|---|---|---|---|
| Surf | c (1/Radius) | K | A4 | A6 | A8 |
| 3 | 1.00725E−01 | 0.00000E+00 | 1.28800E−03 | −1.78100E−05 | 2.92500E−06 |
| 4 | 5.27704E−01 | −1.38300E+00 | 1.81900E−02 | 2.56400E−04 | 3.89900E−04 |
| 5 | −3.62056E−01 | −1.75200E−01 | −2.05400E−03 | 5.49700E−04 | 1.55800E−04 |
| 6 | −1.09577E−01 | 0.00000E+00 | 1.34800E−03 | 4.89300E−04 | 3.04900E−04 |
| 7 | 1.39315E−01 | 0.00000E+00 | 1.25500E−04 | 2.58900E−05 | 1.64200E−04 |
| 8 | −2.34687E−01 | −2.26800E+00 | 3.62900E−03 | 2.60300E−04 | 0.00000E+00 |
| 10 | 1.89970E−01 | 0.00000E+00 | −1.59100E−03 | −7.08900E−04 | 0.00000E+00 |
| 11 | −3.26797E−01 | −6.47600E−01 | −1.66100E−03 | −3.53700E−04 | 2.14500E−05 |
| 12 | −1.69233E−01 | −2.27700E+00 | −2.89800E−03 | 1.93900E−05 | 1.52900E−04 |
| 13 | 5.13084E−01 | −2.27700E+00 | 6.53100E−03 | −2.10600E−03 | 2.74200E−04 |
| 14 | −3.08642E−01 | −2.27700E+00 | 9.06400E−04 | 2.41500E−05 | 5.77200E−05 |

As illustrated in Table 7, with respect to the wide-angle lens 100 of the present embodiment, the focal length f0 of the entire lens system is 1.315 mm; the object-to-image distance is 17.370 mm; the F-value of the entire lens system is 2.0; the maximum field angle is 195 deg; and the horizontal field angle is 195 deg.

As illustrated in Table 8, the abbe numbers vd of the second lens 20, the third lens 30, the fifth lens 50, and the seventh lens 70 are all greater than 50. More specifically, the abbe numbers vd of the second lens 20, the third lens 30, and the seventh lens 70 are all 56.0, and the refractive indexes Nd of the second lens 20, the third lens 30, and the seventh lens 70 are all 1.531. The abbe number vd of the fifth lens 50 is 64.1, and the refractive index Nd of the fifth lens 50 is 1.619. The refractive index Nd of the sixth lens 60 is 1.635, and therefore the sixth lens 60 and the seventh lens 70 differ in refractive indexes Nd.

As described above, the wide-angle lens 100 of the present embodiment has a lens configuration with seven lenses in six groups, of which all of the six lenses are plastic. Accordingly, it is possible to reduce cost of the wide-angle lens 100 as well as reducing size and weight. Furthermore, in the present embodiment, in accordance with arrangement of the third lens 30, which is a negative lens, it is possible to achieve a lens configuration with arrangement of the fourth lens 40 and the fifth lens 50, which are positive lenses, on both sides (i.e., the object side and the image side) of the diaphragm 80, respectively. Further, in the lens configuration, the sides of the diaphragm 80 are nearly symmetric. In addition, the fourth lens 40 and the fifth lens 50 are double convex lenses whose convex surfaces face both of the object side and the image side. Therefore, a configuration in which the sides, with reference to the diaphragm 80, are further symmetric. Accordingly, it is possible to achieve similar effects as Embodiment 1, such as reducing astigmatism and chromatic aberration of magnification at the peripheral section.

Furthermore, in a case where a combined focal length of the fifth lens 50, the sixth lens 60, and the seventh lens 70 is f567 (mm) and a focal length of the entire lens system is f0 (mm), the combined focal length f567 of the fifth lens 50, the sixth lens 60, and the seventh lens 70 and the focal length f0 of the entire lens system meet Condition (1) below.

$$2 < f567/f0 < 4 \quad \text{Condition (1):}$$

More specifically, the combined focal length f567 of the fifth lens 50, the sixth lens 60, and the seventh lens 70 is 4.299 mm, and the focal length f0 of the entire lens system is 1.315 mm. Therefore, as f567/f0 is 3.268, the above Condition (1) is met.

As described above, in the present embodiment, f567/f0 is greater than 2. Therefore, the power provided by the fifth lens 50, the sixth lens 60, and the seventh lens 70 is prevented from becoming weak. Accordingly, correction of each type of aberration, especially chromatic aberration, can be favorably performed, and high optical performance can be achieved. Furthermore, as f567/f0 is lower than 4, the power provided by the fifth lens 50, the sixth lens 60, and the seventh lens 70 is prevented from becoming too strong. Accordingly, it is possible to avoid the total length of the entire lens system from becoming long.

Furthermore, it is further preferable that the combined focal length f567 of the fifth lens 50, the sixth lens 60, and the seventh lens 70 and the focal length f0 of the entire lens system meet Condition (1-2) below.

$$2.5 < f567/f0 < 3.5 \quad \text{Condition (1-2):}$$

In the present embodiment, f567/f0 is greater than 2.5. Therefore, the power provided by the fifth lens 50, the sixth lens 60, and the seventh lens 70 is prevented from becoming weak. Accordingly, correction of each type of aberration, especially chromatic aberration, can be more favorably performed, and high optical performance can be achieved. Furthermore, as f567/f0 is lower than 3.5, the power provided by the fifth lens 50, the sixth lens 60, and the seventh lens 70 is prevented from becoming too strong. Accordingly, it is possible to avoid the total length of the entire lens system from becoming long.

Furthermore, in a case where a combined focal length of the fourth lens 40 and the fifth lens 50 is f45 (mm) and a focal length of the entire lens system is f0 (mm), the focal length f45 of the fourth lens 40 and the fifth lens 50 and the focal length f0 of the entire lens system meet Condition (2) below.

$$1 < f45/f0 < 3 \quad \text{Condition (2):}$$

More specifically, the combined focal length f45 of the fourth lens 40 and the fifth lens 50 is 2.774, and the focal length f0 of the entire lens system is 1.315 mm. Therefore, as f45/f0 is 2.109, the above Condition (2) is met.

As described above, in the present embodiment, f45/f0 is greater than 1. Therefore, the power provided by the fourth lens 40 and the fifth lens 50 is prevented from becoming weak. Accordingly, correction of each type of aberration can be favorably performed, and high optical performance can be achieved. Furthermore, as f45/f0 is lower than 3, the power provided by the fourth lens 40 and the fifth lens 50 is prevented from becoming too strong. Accordingly, it is possible to avoid the total length of the entire lens system from becoming long.

Furthermore, in a case where: the first lens 10, the second lens 20, and the third lens 30 form a negative lens group; the fourth lens 40, the fifth lens 50, the sixth lens 60, and the seventh lens 70 form a positive lens group; and a combined focal length of the negative lens group is fN (mm) and a combined focal length of the positive lens group is fP (mm), then the combined focal length fN of the negative lens group and the combined focal length fP of the positive lens group meet a condition below.

$$0.1 < |fN/fP| < 0.5 \quad \text{Condition (3):}$$

More specifically, the combined focal length fN of the negative lens group is −1.395, and the combined focal length fP of the positive lens group is 4.110. Therefore, as |fN/fP| is 0.339, the above Condition (3) is met.

As described above, in the present embodiment, |fN/fP| is greater than 0.1. Therefore, negative power provided by the negative lens group can be reduced. Accordingly, correction of field curvature and comatic aberration can be favorably performed. Furthermore, as |fN/fP| is lower than 0.5, it is possible to avoid the total length of the entire lens system from becoming long.

Furthermore, in a case where an object-to-image distance is d0 (mm) and a focal length of the entire lens system is f0 (mm), the object-to-image distance d0 and the focal length f0 of the entire lens system meet a condition below.

$$8 < d0/f0 < 15 \quad \text{Condition (4):}$$

More specifically, the object-to-image distance d0 (mm) is 17.370, and the focal length f0 of the entire lens system is 1.315 mm. Therefore, as d0/f0 is 13.205, the above Condition (4) is met.

As described above, in the present embodiment, d0/f0 is greater than 8. Therefore, spherical aberration and distortion can be properly corrected. Furthermore, as d0/f0 is lower than 15, lens diameters are prevented from becoming too large, and it is possible to avoid the total length of the entire lens system from becoming long.

Furthermore, in a case where the abbe number of the sixth lens is ν6 and the abbe number of the seventh lens is ν7, the abbe numbers ν6 and ν7 respectively meet conditions below.

$$\nu 6 \leq 30 \quad \text{Condition (5):}$$

$$50 \leq \nu 7 \quad \text{Condition (6):}$$

More specifically, the abbe number ν6 is 24.2 and the abbe number ν7 is 56.0. Accordingly, the abbe numbers ν6 and ν7 respectively meet Conditions (5) and (6). Therefore, chromatic aberration can be properly corrected.

The invention claimed is:

1. A wide-angle lens, comprising:
a first lens, a second lens, a third lens, a fourth lens, a diaphragm, a fifth lens, a sixth lens, and a seventh lens, which are arranged in this order from an object side, wherein
the first lens is a negative meniscus lens whose convex surface faces the object side,
the second lens is a negative meniscus lens whose at least one surface is an aspherical surface and whose concave surface faces an image side,
the third lens is a negative meniscus lens whose at least one surface is an aspherical surface and whose concave surface faces the object side,
the fourth lens is a positive lens,
the fifth lens is a positive lens,
the sixth lens is a negative lens whose concave surface faces the image side,
the seventh lens is a double convex lens whose convex surfaces face both of the object side and the image side, and
the sixth lens and the seventh lens configure a joined lens, of which the surface of the sixth lens on the image side and the surface of the seventh lens on the object side are joined by use of a resin material;

wherein
where a combined focal length of the fourth lens and the fifth lens is f45 (mm) and a focal length of an entire lens system is f0 (mm), the combined focal length f45 of the fourth lens and the fifth lens and the focal length f0 of the entire lens system meet a condition below:

$1 < f45/f0 < 3$.

2. The wide-angle lens according to claim 1, wherein
the fifth lens is a double convex lens whose convex surfaces face both of the object side and the image side.

3. The wide-angle lens according to claim 2, wherein
the fourth lens is a double convex lens whose convex surfaces face both of the object side and the image side.

4. The wide-angle lens according to claim 1, wherein
at least one of the fourth lens and the fifth lens is a glass lens.

5. The wide-angle lens according to claim 1, wherein
the first lens is a glass lens.

6. The wide-angle lens according to claim 1, wherein
where a combined focal length of the fifth lens, the sixth lens, and the seventh lens is f567 (mm) and a focal length of an entire lens system is f0 (mm), the combined focal length f567 of the fifth lens, the sixth lens, and the seventh lens and the focal length f0 of the entire lens system meet a condition below:

$2 < f567/f0 < 4$.

7. A wide-angle lens, comprising:
a first lens, a second lens, a third lens, a fourth lens, a diaphragm, a fifth lens, a sixth lens, and a seventh lens, which are arranged in this order from an object side, wherein
the first lens is a negative meniscus lens whose convex surface faces the object side,
the second lens is a negative meniscus lens whose at least one surface is an aspherical surface and whose concave surface faces an image side,
the third lens is a negative meniscus lens whose at least one surface is an aspherical surface and whose concave surface faces the object side,
the fourth lens is a positive lens,
the fifth lens is a positive lens,
the sixth lens is a negative lens whose concave surface faces the image side,
the seventh lens is a double convex lens whose convex surfaces face both of the object side and the image side, and
the sixth lens and the seventh lens configure a joined lens, of which the surface of the sixth lens on the image side and the surface of the seventh lens on the object side are joined by use of a resin material;
wherein
the first lens, the second lens, and the third lens form a negative lens group,
the fourth lens, the fifth lens, the sixth lens, and the seventh lens form a positive lens group, and
where a combined focal length of the negative lens group is fN (mm) and a combined focal length of the positive lens group is fP (mm), the combined focal length fN of the negative lens group and the combined focal length fP of the positive lens group meet a condition below:

$0.1 < |fN/fP| < 0.5$.

8. The wide-angle lens according to claim 1, wherein
where an object-to-image distance is d0 and a focal length of an entire lens system is f0 (mm), the object-to-image distance d0 and the focal length f0 of the entire lens system meet a condition below:

$8 < d0/f0 < 15$.

9. The wide-angle lens according to claim 1, wherein
where an abbe number of the sixth lens is v6 and an abbe number of the seventh lens is v7, the abbe number v6 and the abbe number v7 respectively meet conditions below:

$v6 \leq 30$; and $50 \leq v7$.

10. The wide-angle lens according to claim 7, wherein
the fifth lens is a double convex lens whose convex surfaces face both of the object side and the image side.

11. The wide-angle lens according to claim 10, wherein
the fourth lens is a double convex lens whose convex surfaces face both of the object side and the image side.

12. The wide-angle lens according to claim 7, wherein
at least one of the fourth lens and the fifth lens is a glass lens.

13. The wide-angle lens according to claim 7, wherein
the first lens is a glass lens.

14. The wide-angle lens according to claim 7, wherein
where a combined focal length of the fifth lens, the sixth lens, and the seventh lens is f567 (mm) and a focal length of an entire lens system is f0 (mm), the combined focal length f567 of the fifth lens, the sixth lens, and the seventh lens and the focal length f0 of the entire lens system meet a condition below:

$2 < f567/f0 < 4$.

15. The wide-angle lens according to claim 7, wherein
where an object-to-image distance is d0 and a focal length of an entire lens system is f0 (mm), the object-to-image distance d0 and the focal length f0 of the entire lens system meet a condition below:

$8 < d0/f0 < 15$.

16. The wide-angle lens according to claim 7, wherein
where an abbe number of the sixth lens is v6 and an abbe number of the seventh lens is v7, the abbe number v6 and the abbe number v7 respectively meet conditions below:

$v6 \leq 30$; and $50 \leq v7$.

* * * * *